(12) United States Patent
Lee et al.

(10) Patent No.: US 12,456,164 B2
(45) Date of Patent: Oct. 28, 2025

(54) ELECTRONIC DEVICE FOR CONTROLLING RESOLUTION OF EACH OF PLURALITY OF AREAS INCLUDED IN IMAGE ACQUIRED FROM CAMERA AND METHOD THEREOF

(71) Applicant: Samsung Electronics Co., Ltd., Suwon-si (KR)

(72) Inventors: Boyoung Lee, Suwon-si (KR); Sungoh Kim, Suwon-si (KR); Donghyun Yeom, Suwon-si (KR); Daehee Kim, Suwon-si (KR); Suhyung Kim, Suwon-si (KR); Jihyun Kim, Suwon-si (KR); Sanghun Lee, Suwon-si (KR); Yongil Cho, Suwon-si (KR); Sungsoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 18/333,959

(22) Filed: Jun. 13, 2023

(65) Prior Publication Data

US 2024/0104695 A1 Mar. 28, 2024

Related U.S. Application Data

(63) Continuation of application No. PCT/KR2023/007706, filed on Jun. 5, 2023.

(30) Foreign Application Priority Data

Sep. 23, 2022 (KR) .......................... 10-2022-0120890
Oct. 21, 2022 (KR) .......................... 10-2022-0136901

(51) Int. Cl.
*G06T 3/4092* (2024.01)
*G06F 3/01* (2006.01)
(Continued)

(52) U.S. Cl.
CPC ............ *G06T 3/4092* (2013.01); *G06F 3/013* (2013.01); *G06T 7/10* (2017.01); *G06T 7/70* (2017.01)

(58) Field of Classification Search
CPC . G06T 3/4092; G06T 7/10; G06T 7/70; G06F 3/013
See application file for complete search history.

(56) References Cited

U.S. PATENT DOCUMENTS 9,256,987 B2  2/2016  Ackerman et al.
10,330,935 B2  6/2019  Shpunt
(Continued)

FOREIGN PATENT DOCUMENTS

JP  2018/073104 A  5/2018
JP  2018/085595 A  5/2018
(Continued)

*Primary Examiner* — Yu Chen
(74) *Attorney, Agent, or Firm* — Jefferson IP Law, LLP

(57) ABSTRACT

A processor of a wearable device is provided. The processor includes obtaining posture information of the wearable device in a space including the wearable device, based on classification information for selecting at least one feature point within pixels based on differences between pixels included in a first frames output from a first camera, identifying resolutions of each of a plurality of areas included in field-of-view (FoV) formed based on a display, based on the number of feature points obtained in each of the plurality of areas by the classification information, and changing resolution, among resolutions identified based on gaze information indicating gaze of user wearing the wearable device, corresponding to a first area, among a plurality of areas, to resolution larger than resolution corresponding to second area.

20 Claims, 13 Drawing Sheets

(51) Int. Cl.
    *G06T 7/10*           (2017.01)
    *G06T 7/70*           (2017.01)

(56) References Cited

U.S. PATENT DOCUMENTS

| | | |
|---|---|---|
| 10,890,968 B2 | 1/2021 | Kurlethimar et al. |
| 11,010,956 B2 | 5/2021 | Blackmon et al. |
| 11,087,437 B2 | 8/2021 | Young et al. |
| 11,199,705 B2 | 12/2021 | Stafford et al. |
| 11,244,496 B2 | 2/2022 | Kimura et al. |
| 2016/0110919 A1* | 4/2016 | Hancock ................. G06T 19/20 345/428 |
| 2018/0144196 A1* | 5/2018 | Vaziri .................... G06V 40/19 |
| 2021/0349528 A1* | 11/2021 | Son .................... G02B 27/0093 |
| 2021/0350570 A1* | 11/2021 | Hibi ........................ G06V 20/64 |
| 2022/0291742 A1 | 9/2022 | Otsuka |
| 2023/0084960 A1 | 3/2023 | Jang et al. |
| 2024/0357066 A1* | 10/2024 | Li ......................... H04N 13/398 |
| 2024/0393874 A1* | 11/2024 | Shi .......................... G06F 3/013 |
| 2024/0420477 A1* | 12/2024 | Vaziri .................... H04R 1/028 |

FOREIGN PATENT DOCUMENTS

| | | |
|---|---|---|
| JP | 2021/056783 A | 4/2021 |
| KR | 10-1965746 B1 | 3/2019 |
| KR | 10-2019-0123039 A | 10/2019 |
| KR | 10-2354132 B1 | 1/2022 |

\* cited by examiner

ELECTRONIC DEVICE FOR CONTROLLING RESOLUTION OF EACH OF PLURALITY OF AREAS INCLUDED IN IMAGE ACQUIRED FROM CAMERA AND METHOD THEREOF

CROSS-REFERENCE TO RELATED APPLICATION(S)

This application is a continuation application, claiming priority under § 365(c), of an International application No. PCT/KR2023/007706, filed on Jun. 5, 2023, which is based on and claims the benefit of a Korean patent application number 10-2022-0120890, filed on Sep. 23, 2022, in the Korean Intellectual Property Office, and of a Korean patent application number 10-2022-0136901, filed on Oct. 21, 2022, in the Korean Intellectual Property Office, the disclosure of each of which is incorporated by reference herein in its entirety.

TECHNICAL FIELD

The disclosure relates to an electronic device and a method for controlling each of resolution of a plurality of areas included in an image obtained from a camera.

BACKGROUND ART

An electronic device for an interaction between reality and the virtual world in virtual reality (VR), augmented reality (AR), and/or mixed reality (MR) are emerging. The electronic device may be classified into closed-type electronic devices in which the outside is not visible, and see-through type electronic devices in which an external environment and an image of a display are viewed together. The closed-type electronic devices may render a screen based on frames obtained through a camera of the electronic device. The closed-type electronic devices may provide a virtual reality service to a user based on displaying the screen in the display.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device and a method for controlling each of resolution of a plurality of areas included in an image obtained from a camera.

Additional aspects will be set forth in part in the description which follows and, in part, will be apparent from the description, or may be learned by practice of the presented embodiments.

In accordance with an aspect of the disclosure, a wearable device is provided. The wearable device includes a display, a first camera, a second camera, and a processor. The processor may be configured to obtain posture information of the wearable device in a space including the wearable device based on classification information for selecting at least one feature point, the classification information being based on differences between pixels included in first frames output from the first camera. The processor may be configured to identify, based on a number of the at least one feature point selected in each of the plurality of areas by the classification information, resolutions of each of a plurality of areas included in a field-of-view (FoV) formed based on the display. The processor may be configured to change a resolution corresponding to a first area among the plurality of areas to be higher than a resolution corresponding to a second area among the plurality of areas, based on gaze information indicating a gaze of a user wearing the wearable device. The processor may be configured to adjust all of the identified resolutions to a resolution lower than a designated resolution, in response to recognizing a rotation of the wearable device based on the posture information. The processor may be configured to generate a screen corresponding to second frames output from the second camera, by adjusting a resolution of the second frames based on at least one of the resolution changed based on the gaze information or the resolutions adjusted in response to recognizing the rotation of the wearable device. The processor may be configured to display the generated screen, in FoV, by using the display.

In accordance with another aspect of the disclosure, a method performed by a wearable device is provided. The method includes identifying a rotation speed of the wearable device by using a first camera. The method may comprise generating a first screen to be displayed through a display, by sampling frames obtained from a second camera based first resolutions of plurality of areas included in a field of view (FoV) formed based on the display, in case that the rotation speed of the wearable device is identified as a first rotation speed. The method may comprise generating a second screen to be displayed through the display, by sampling frames obtained from the second camera based on second resolution lower than the first resolutions, in case that the rotation speed of the wearable device is identified as a second rotation speed exceeding the first rotation speed.

In accordance with another aspect of the disclosure, a wearable device is provided. The wearable device includes a display, a first camera, a second camera, and a processor. The processor may be configured to identify a rotation speed of the wearable device by using the first camera. The processor may be configured to generate a first screen to be displayed through the display, by sampling frames obtained from the second camera based first resolutions of plurality of areas included in a field-of-view (FoV) formed based on the display, in case that the rotation speed of the wearable device is identified as a first rotation speed. The processor may be configured to generate a second screen to be displayed through the display, by sampling frames obtained from the second camera based on second resolution lower than the first resolutions, in case that the rotation speed of the wearable device is identified as a second rotation speed exceeding the first rotation speed.

In accordance with another aspect of the disclosure, a method of a wearable device is provided. The method includes obtaining posture information of the wearable device in a space including the wearable device based on classification information for selecting at least one feature point, the classification information being based on differences between pixels included in first frames output from the first camera. The method may comprise identifying, based on a number of the at least one feature point selected in each of the plurality of areas by the classification information, resolutions of each of a plurality of areas included in a field-of-view (FoV) formed based on the display. The method may comprise changing a resolution corresponding to a first area among the plurality of areas to be higher than a resolution corresponding to a second area among the plurality of areas, based on gaze information indicating a gaze of a user wearing the wearable device. The method may comprise adjusting all of the identified resolutions to be lower than a designated resolution, in response to recognizing a rotation of the wearable device based on the posture information. The method may comprise generating a screen corresponding to second frames output from the second camera, by adjusting a resolution of the second frames based on at least one of the resolution changed based on the gaze information or the resolutions adjusted in response to recognizing the rotation of the wearable device. The method may comprise displaying the generated screen, in FoV, by using the display.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
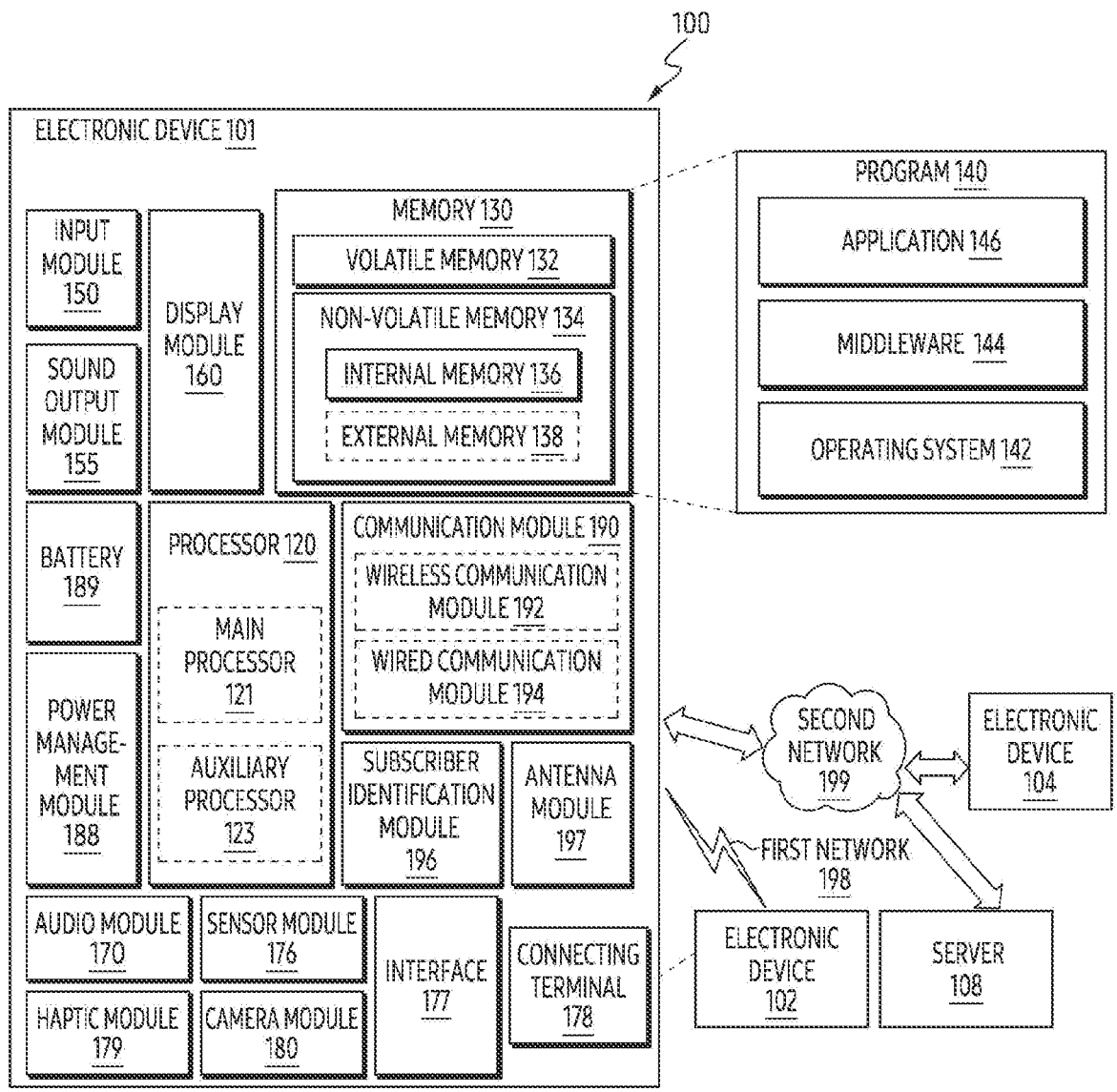
FIG. 1 is a block diagram of an electronic device in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
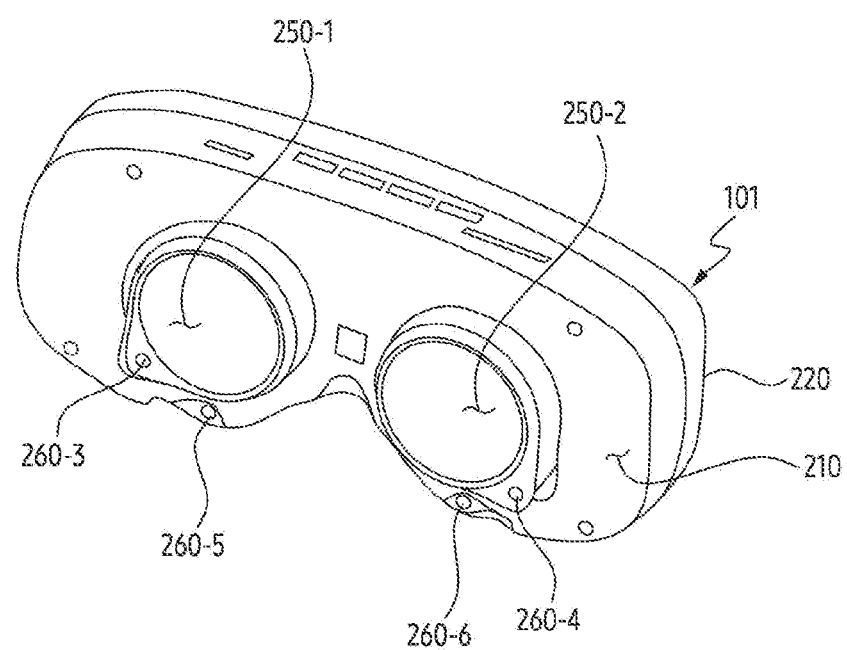
FIGS. 2A and 2B illustrate an example of appearance of a wearable device, according to various embodiments of the disclosure.
Figure 2B:
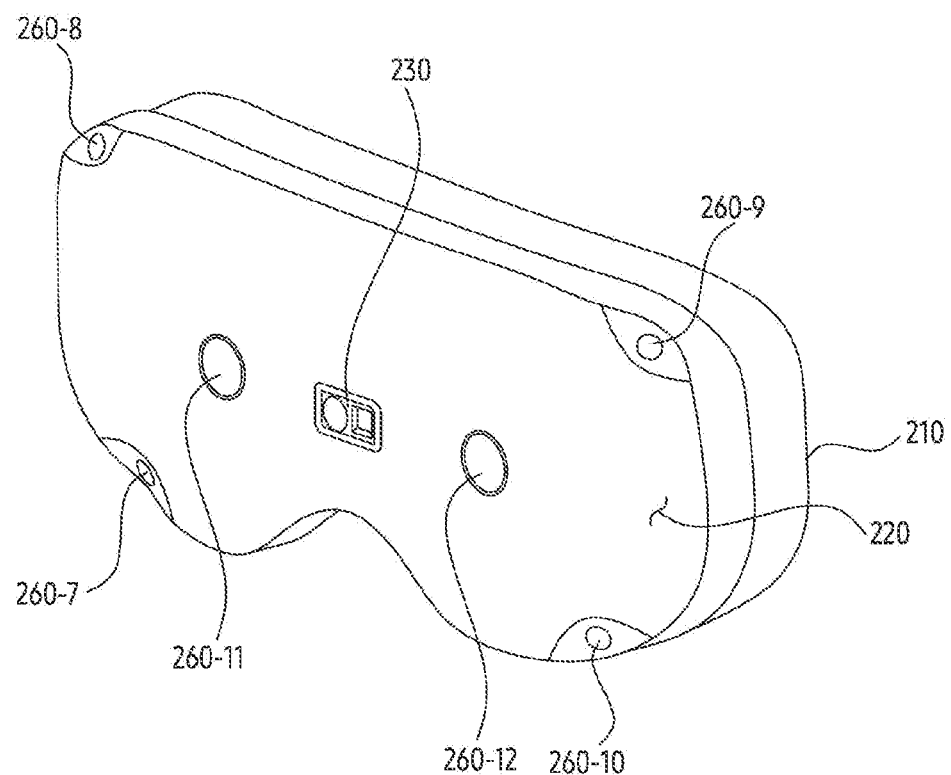

FIGS. 2A and 2B illustrate an example of appearance of a wearable device, according to various embodiments of the disclosure. The wearable device 101 of FIGS. 2A and 2B may be an example of the electronic device 101 of FIG. 1. According to an embodiment, the wearable device 101 may have a form of glasses that may be worn on the user's body part (e.g., head). The wearable device 101 may include a head-mounted display (HMD). For example, a housing of the wearable device 101 may include flexible materials that adheres closely to a portion of the user's head (e.g., a part of the face that encloses both eyes), such as rubber and/or silicon. For example, the housing of the wearable device 101 may include one or more straps able to be twined around the user's head, and/or one or more temples attachable to the ear of the head.

According to an embodiment, an example of the appearance of the first surface 210 of the housing of the wearable device 101 may be illustrated in FIG. 2A, and an example of the appearance of the second surface 220 opposite to the first surface 210 may be illustrated in FIG. 2B.

Referring to FIG. 2A, according to an embodiment, the first surface 210 of the wearable device 101 may have a form attachable on the user's body part (e.g., the user's face). Although not illustrated, the wearable device 101 may further include a strap and/or one or more temples for being fixed on the user's body part. A first display 250-1 for outputting an image to the left eye among the user's both eye and a second display 250-2 for outputting an image to the right eye among the user's both eye may be disposed on the first surface 210. The wearable device 101 may further include rubber or silicon packing formed on the first surface 210 and preventing interference by light (e.g., ambient light) different from the light propagated from the first display 250-1 and the second display 250-2.

According to an embodiment, the wearable device 101 may include cameras 260-3 and 260-4 for photographing and/or tracking both eyes of the user adjacent to each of the first display 250-1 and the second display 250-2. The cameras 260-3 and 260-4 may be referred to as an ET camera. According to an embodiment, the wearable device 101 may include cameras 260-5 and 260-6 for photographing and/or recognizing a user's face. The cameras 260-5 and 260-6 may be referred to as an FT camera.

Referring to FIG. 2B, a camera (e.g., cameras 260-7, 260-8, 260-9, 260-10, 260-11, and 260-12) and/or a sensor (e.g., a depth sensor 230) for obtaining information related to the external environment of the wearable device 101 may be disposed on the second surface 220 opposite to the first surface 210 of FIG. 2A. For example, the cameras 260-7, 260-8, 260-9, and 260-10 may be disposed on the second surface 220 to recognize an external object different from the wearable device 101. For example, the wearable device 101 may obtain an image and/or video to be transmitted to each of the user's both eyes, by using cameras 260-11 and 260-12. The camera 260-11 may be disposed on the second surface 220 of the wearable device 101 to obtain an image to be displayed through the second display 250-2 corresponding to the right eye of the user's both eyes. The camera 260-12 may be disposed on the second surface 220 of the wearable device 101 to obtain an image to be displayed through the first display 250-1 corresponding to the left eye of the user's both eyes.

According to an embodiment, the wearable device 101 may include the depth sensor 230 disposed on the second surface 220 to identify a distance between the wearable device 101 and an external object. The wearable device 101 may obtain spatial information (e.g., a depth map) on at least a part of the FoV of the user wearing the wearable device 101, by using the depth sensor 230.

Although not illustrated, a microphone for obtaining sound output from an external object may be disposed on the second surface 220 of the wearable device 101. The number of microphones may be one or more according to embodiments.

Figure 3A:
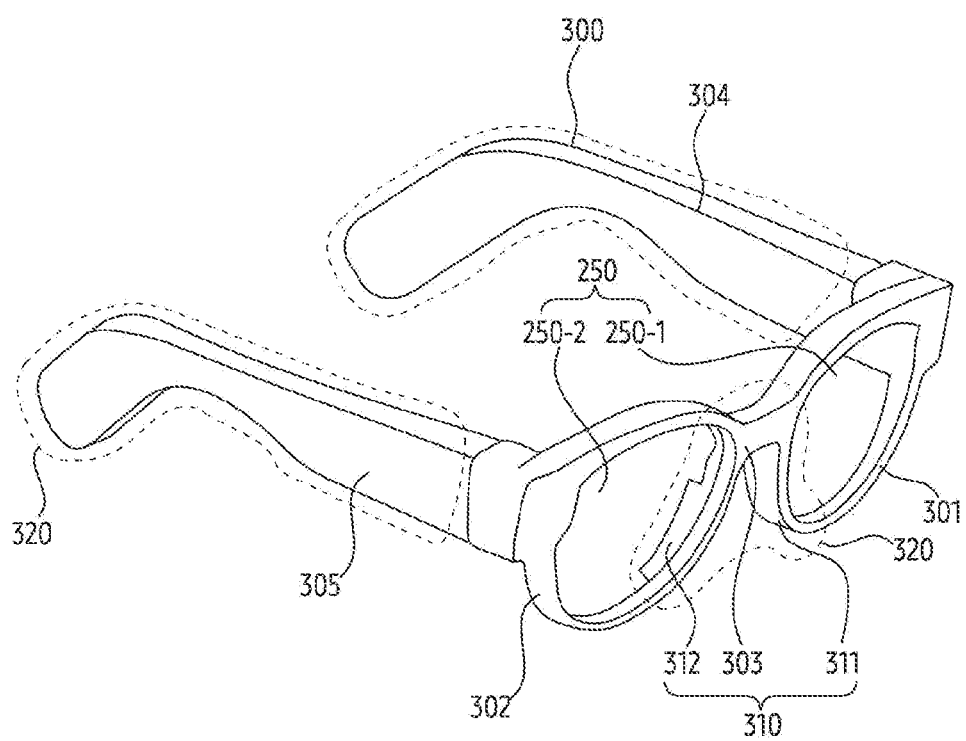
FIG. 3A illustrates an example of a perspective view of a wearable device, according to an embodiment of the disclosure.
Figure 3B:
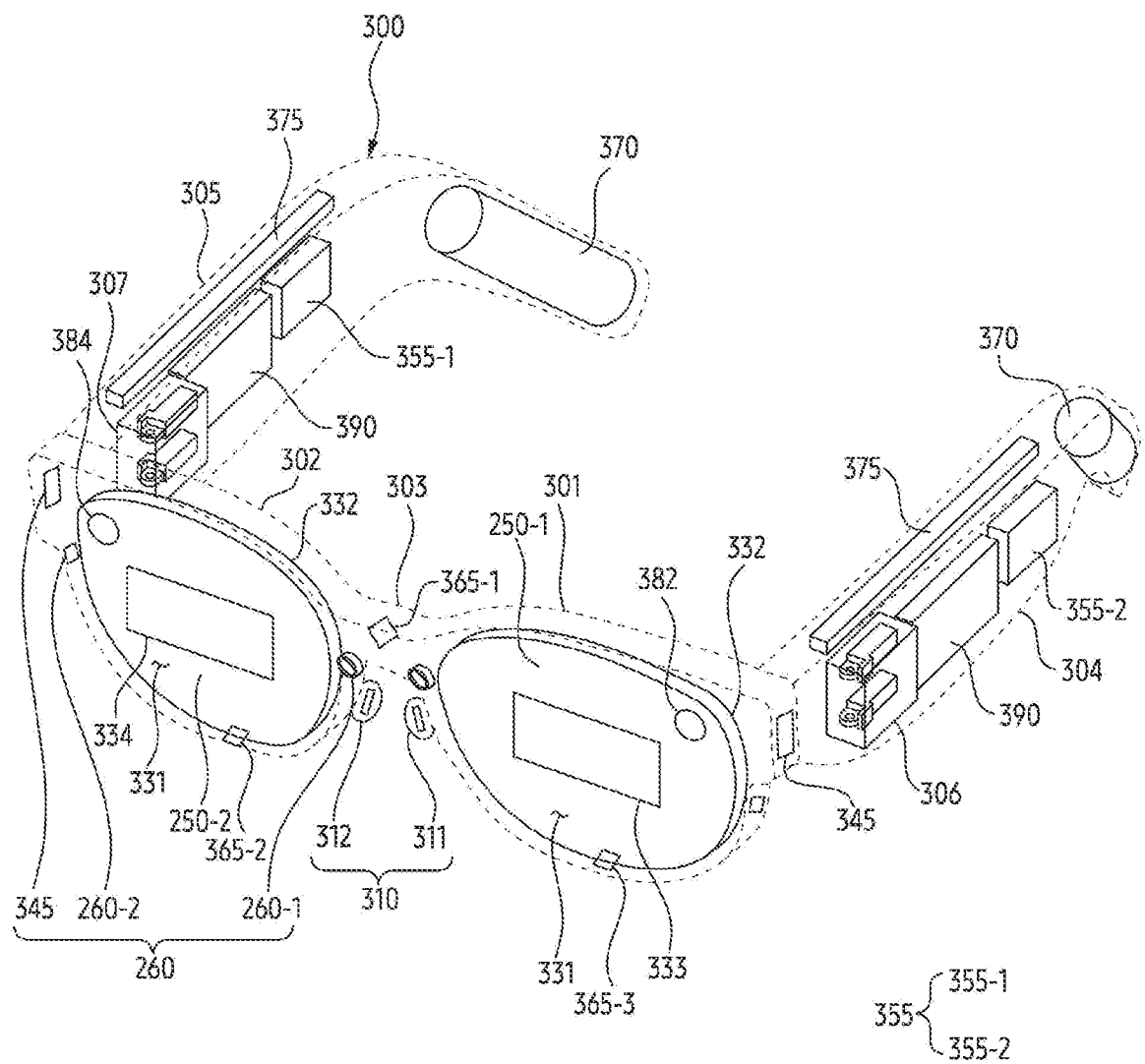
FIG. 3B illustrates an example of one or more hardware disposed in a wearable device, according to an embodiment of the disclosure.

FIG. 3A illustrates an example of a perspective view of a wearable device, according to an embodiment of the disclosure. FIG. 3B illustrates an example of one or more hardware disposed in a wearable device, according to an embodiment of the disclosure. According to an embodiment, the wearable device 101 may have a form of glasses wearable on the user's body part (e.g., head). The wearable device 101 of FIGS. 3A and 3B may be an example of the electronic device 101 of FIG. 1 and/or the wearable device 101 of FIGS. 2A and 2B.

Referring to FIG. 3A, according to an embodiment, the wearable device 101 may include at least one display 250 and a frame 300 supporting the at least one display 250.

According to an embodiment, the wearable device 101 may be worn on a part of the user's body. The wearable device 101 may provide augmented reality (AR), virtual reality (VR), or mixed reality (MR) that combines augmented reality and virtual reality to a user wearing the wearable device 101. For example, in response to a user's designated gesture obtained through a motion recognition camera 260-2 of FIG. 3B, the wearable device 101 may display a virtual reality image provided by at least one optical device 382 and 384 of FIG. 3B on the at least one display 250.

According to an embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the user's left and right eyes, respectively.

Referring to FIG. 3B, the at least one display 250 may provide visual information transmitted from the external light and other visual information different from the visual information to the user through a lens included in the at least one display 250. The lens may be formed based on at least one of a Fresnel lens, a pancake lens, or a multi-channel lens. For example, the at least one display 250 may include a first surface 331 and a second surface 332 opposite to the first surface 331. A display area may be formed on the second surface 332 of the at least one display 250. When the user wears the wearable device 101, external light may be transmitted to the user by entering the first surface 331 and penetrating through the second surface 332. For another example, the at least one display 250 may display an augmented reality image in which a reality screen transmitted through the external light and a virtual reality image provided from at least one optical device 382 and 384 are combined on the display area formed on the second surface 332.

In an embodiment, the at least one display 250 may include at least one waveguide 333 and 334 that diffracts light transmitted from the at least one optical device 382 and 384 and transmits it to the user. The at least one waveguide 333 and 334 may be formed based on at least one of glass, plastic, or polymer. A nano pattern may be formed on at least a part of the outside or inside of the at least one waveguide 333 and 334. The nano pattern may be formed based on a grating structure of a polygonal or curved shape. Light incident on one end of the at least one waveguide 333 and 334 may be propagated to another end of the at least one waveguide 333 and 334 by the nano pattern. The at least one waveguide 333 and 334 may include at least one of a diffraction element (e.g., diffractive optical element (DOE), holographic optical element (HOE)) and a reflection element (e.g., a reflection mirror). For example, the at least one waveguide 333 and 334 may be disposed in the wearable device 101 to guide a screen displayed by the at least one display 250 to the user's eyes. For example, the screen may be transmitted to the user's eyes based on total internal reflection (TIR) generated within the at least one waveguide 333 and 334.

The wearable device 101 may analyze an object included in the real image collected through a photographing camera 345 and combine a virtual object corresponding to an object to be provided with augmented reality among the analyzed objects, and display it on the at least one display 250. The virtual object may include at least one of text and images for various information related to the object included in the real image. The wearable device 101 may analyze an object based on a multi-camera such as a stereo camera. For the object analysis, the wearable device 101 may execute time-of-flight (ToF) and/or simultaneous localization and mapping (SLAM) supported by the multi-camera. A user wearing the wearable device 101 may view an image displayed on the at least one display 250.

According to an embodiment, the frame 300 may have a physical structure in which the wearable device 101 may be worn on the user's body. According to an embodiment, the frame 300 may be configured so that the first display 250-1 and the second display 250-2 may be positioned to correspond to the user's left and right eyes when the user wears the wearable device 101. The frame 300 may support the at least one display 250. For example, the frame 300 may support the first display 250-1 and the second display 250-2 to be positioned in positions corresponding to the user's left and right eyes.

Referring to FIG. 3A, when a user wears the wearable device 101, the frame 300 may include an area 320 in which at least a part is in contact with a part of the user's body. For example, the area 320 in contact with a part of the user's body of the frame 300 may include an area in contact with a part of the user's nose, a part of the user's ear, and a part of the side of the user's face that the wearable device 101 contacts. According to an embodiment, the frame 300 may include a nose pad 310 in contact with a part of the user's body. When the wearable device 101 is worn by the user, the nose pad 310 may contact a part of the user's nose. The frame 300 may include a first temple 304 and a second temple 305 in contact with another part of the user's body, which is distinguished from a part of the user's body.

For example, the frame 300 may include a first rim 301 surrounding at least a part of the first display 250-1, a second rim 302 surrounding at least a part of the second display 250-2, a bridge 303 disposed between the first rim 301 and the second rim 302, a first pad 311 disposed along a part of the edge of the first rim 301 from one end of the bridge 303, a second pad 312 disposed along a part of the edge of the second rim 302 from another end of the bridge 303, a first temple 304 extending from the first rim 301 and fixed to a part of the wearer's ear, and a second temple 305 extending from the second rim 302 and fixed to a part of an ear opposite to the ear. The first pad 311 and the second pad 312 may be in contact with a part of the user's nose, and the first temple 304 and the second temple 305 may be in contact with a part of the user's face and a part of the ear. The temple 304 and the temple 305 may be rotatably connected to a rim through hinge units 306 and 307 of FIG. 3B. The first temple 304 may be rotatably connected to the first rim 301 through the first hinge unit 306 disposed between the first rim 301 and the first temple 304. The second temple 305 may be rotatably connected to the second rim 302 through the second hinge unit 307 disposed between the second rim 302 and the second temple 305. According to an embodiment, the wearable device 101 may identify an external object (e.g., the user's fingertip) touching the frame 300 and/or a gesture performed by the external object, by using a touch sensor, a grip sensor, and/or a proximity sensor formed on at least a part of the surface of the frame 300.

According to an embodiment, the wearable device 101 may include hardware (e.g., hardware described below based on the block diagram of FIG. 4) performing various functions. For example, the hardware may include a battery module 370, an antenna module 375, at least one optical device 382 and 384, speakers 355-1 and 355-2, a microphone (e.g., microphones 365-1, 365-2, 365-3) a light emitting module (not shown), and/or a printed circuit board (PCB) 390. Various hardware may be disposed in the frame 300.

According to an embodiment, the microphone (e.g., microphones 365-1, 365-2, 365-3) of the wearable device 101 may be disposed on at least a part of the frame 300 to obtain an acoustic signal. The first microphone 365-1 disposed on the nose pad 310, the second microphone 365-2 disposed on the second rim 302, and the third microphone 365-3 disposed on the first rim 301 are illustrated in FIG. 3B, but the number and arrangement of microphones are not limited to an embodiment of FIG. 3B. When the number of microphones included in the wearable device 101 is more than one, the wearable device 101 may identify a direction of the acoustic signal by using a plurality of microphones disposed on different parts of the frame 300.

According to an embodiment, at least one optical device 382 and 384 may project a virtual object on the at least one display 250 to provide various image information to the user. For example, the at least one optical device 382 and 384 may be a projector. The at least one optical device 382 and 384 may be disposed adjacent to the at least one display 250 or may be included in the at least one display 250 as a part of the at least one display 250. According to an embodiment, the wearable device 101 may include a first optical device 382 corresponding to the first display 250-1 and a second optical device 384 corresponding to the second display 250-2. For example, the at least one optical device 382 and 384 may include the first optical device 382 disposed at the edge of the first display 250-1 and the second optical device 384 disposed at the edge of the second display 250-2. The first optical device 382 may transmit light to the first waveguide 333 disposed on the first display 250-1, and the second optical device 384 may transmit light to the second waveguide 334 disposed on the second display 250-2.

In an embodiment, the camera 260 may include a photographing camera 345, an eye tracking camera (ET CAM) 260-1, and/or a motion recognition camera 260-2. The photographing camera 345, the eye tracking camera 260-1, and the motion recognition camera 260-2 may be disposed in different positions on the frame 300 and perform different functions. The eye tracking camera 260-1 may output data indicating a gaze of the user wearing the wearable device 101. For example, the wearable device 101 may detect the gaze from an image including the user's eyes obtained through the eye tracking camera 260-1. An example in which the eye tracking camera 260-1 is disposed toward the user's right eye is illustrated in FIG. 3B, but the embodiment is not limited thereto, and the eye tracking camera 260-1 may be disposed alone toward the user's left eye or may be disposed toward both eyes.

In an embodiment, the photographing camera 345 may photograph an actual image or background to be matched with a virtual image to implement augmented reality or mixed reality content. The photographing camera 345 may take an image of a specific object existing at a position viewed by the user and provide the image to the at least one display 250. The at least one display 250 may display one image in which information on the actual image or background including the image of the specific object obtained using the photographing camera 345 and a virtual image provided through the at least one optical device 382 and 384 are overlapped. In an embodiment, the photographing camera 345 may be disposed on the bridge 303 disposed between the first rim 301 and the second rim 302.

In an embodiment, by tracking the gaze of the user wearing the wearable device 101, the eye tracking camera 260-1 may implement a more realistic augmented reality by matching the user's gaze with the visual information provided to the at least one display 250. For example, when the user faces the front, the wearable device 101 may naturally display environmental information related to the user's front in a place where the user is located on the at least one display 250. The eye tracking camera 260-1 may be configured to capture an image of the user's pupil to determine the user's gaze. For example, the eye tracking camera 260-1 may receive gaze detection light reflected from the user's pupil and track the user's gaze based on a location and a movement of the received gaze detection light. In an embodiment, the eye tracking camera 260-1 may be disposed at a position corresponding to the left and right eyes of the user. For example, the eye tracking camera 260-1 may be disposed in the first rim 301 and/or the second rim 302 to face a direction in which the user wearing the wearable device 101 is located.

In an embodiment, the motion recognition camera 260-2 may provide a specific event to a screen provided on the at least one display 250 by recognizing a movement of the user's whole or part of body, such as the user's torso, hand, or face. The motion recognition camera 260-2 may obtain a signal corresponding to a motion by gesture recognition of the user and provide a display corresponding to the signal to the at least one display 250. The processor may identify a signal corresponding to the operation and perform a designated function based on the identification. In an embodiment, the motion recognition camera 260-2 may be disposed on the first rim 301 and/or the second rim 302.

In an embodiment, the camera 260 included in the wearable device 101 is not limited to the eye tracking camera 260-1 and the motion recognition camera 260-2 described above. For example, by using the camera 260 disposed toward FoV of the user, the wearable device 101 may identify an external object included in the FoV. Identifying an external object by the wearable device 101 may be performed based on sensors to identify a distance between the wearable device 101 and an external object, such as a depth sensor and/or a time of flight (ToF) sensor. The camera 260 disposed toward the FoV may support an autofocus function and/or an optical image stabilization (OIS) function. For example, the wearable device 101 may include the camera 260 (e.g., a face tracking (FT) camera) disposed toward the face to obtain an image including the face of a user wearing the wearable device 101.

Although not illustrated, according to an embodiment, the wearable device 101 may further include a light source (e.g., LED) that emits light toward a subject (e.g., the user's eyes, face, and/or external objects in FoV) photographed by using the camera 260. The light source may include an LED having an infrared wavelength. The light source may be disposed on at least one of the frame 300 and the hinge units 306 and 307.

According to an embodiment, the battery module 370 may supply power to electronic components of the wearable device 101. In an embodiment, the battery module 370 may be disposed in the first temple 304 and/or the second temple 305. For example, the battery module 370 may be a plurality of battery modules 370. The plurality of battery modules 370 may be disposed on each of the first temple 304 and the second temple 305. In an embodiment, the battery module 370 may be disposed in the end of the first temple 304 and/or the second temple 305.

In an embodiment, the antenna module 375 may transmit a signal or power to the outside of the wearable device 101 or receive the signal or power from the outside. In an embodiment, the antenna module 375 may be disposed in the first temple 304 and/or the second temple 305. For example, the antenna module 375 may be disposed close to a surface of the first temple 304 and/or the second temple 305.

In an embodiment, the speaker 355 may output an audio signal to the outside of wearable device 101. The sound output module may be referred to as a speaker. In an embodiment, the speaker 355 may be disposed in the first temple 304 and/or the second temple 305 to be disposed adjacent to the ear of the user wearing the wearable device 101. For example, the speaker 355 may include a second speaker 355-2 disposed adjacent to the user's right ear by being disposed within the first temple 304, and a first speaker 355-1 disposed adjacent to the user's left ear by being disposed within the second temple 305.

The light emitting module (not shown) may include at least one light emitting element. The light emitting module may emit light of a color corresponding to a specific state or emit light in an operation corresponding to the specific state to visually provide the user with information on the specific state of the wearable device 101. For example, when charging is required, the wearable device 101 may emit red light at a predetermined period. In an embodiment, the light emitting module may be disposed on the first rim 301 and/or the second rim 302.

Referring to FIG. 3B, according to an embodiment, the wearable device 101 may include a PCB 390. The PCB 390 may be included in at least one of the first temple 304 and the second temple 305. The PCB 390 may include an interposer disposed between at least two sub PCBs. On the PCB 390, one or more hardware included in the wearable device 101 may be disposed. The wearable device 101 may include a flexible PCB (FPCB) for interconnecting the hardware.

According to an embodiment, the wearable device 101 may include at least one of a gyro sensor, a gravity sensor, and/or an acceleration sensor to detect a posture of the wearable device 101 and/or a posture of a body part (e.g., a head) of a user wearing the wearable device 101. Each of the gravity sensor and the acceleration sensor may measure gravity acceleration, and/or acceleration based on designated three-dimensional axes (e.g., x-axis, y-axis, and z-axis) perpendicular to each other. The gyro sensor may measure an angular velocity of each of the designated three-dimensional axes (e.g., the x-axis, the y-axis, and the z-axis). At least one of the gravity sensor, the acceleration sensor, and the gyro sensor may be referred to as an inertial measurement unit (IMU). According to an embodiment, the wearable device 101 may identify the user's motion and/or gesture performed to execute or stop a specific function of the wearable device 101 based on the IMU.

As described above, according to an embodiment, the wearable device 101 may change resolution of each area of the image obtained from the camera (e.g., the cameras 260-1 and 260-2) based on identifying the user's body part. The wearable device 101 may reduce motion to photons (MTP) latency for displaying the screen based on changing the resolutions of the image. The wearable device 101 may prevent dizziness of a user using an augmented reality service by reducing the MTP latency.

Figure 4:
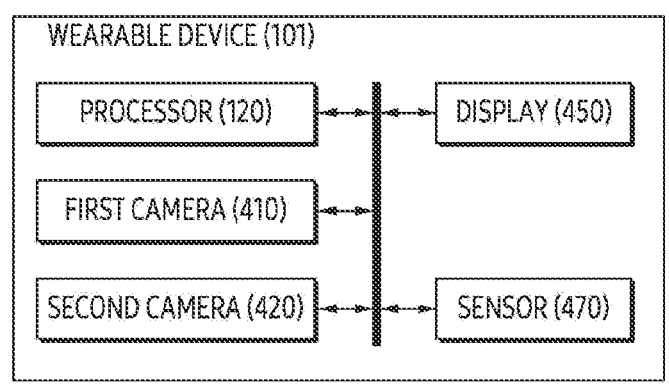
FIG. 4 is a block diagram of a wearable device, according to an embodiment of the disclosure.

FIG. 4 is a block diagram of a wearable device, according to an embodiment of the disclosure. The wearable device 101 may be an example of the electronic device 101 of FIG. 1 and/or the wearable device 101 of FIGS. 2A and 2B.

Referring to FIG. 4, according to an embodiment, the wearable device 101 may include at least one of a processor 120, a first camera 410, a second camera 420, a display 450, or a sensor 470. The processor 120, the first camera 410, the second camera 420, the display 450, and the sensor 470 may be electrically and/or operably coupled with each other by electronic components such as a communication bus. Hereinafter, the operational coupling of hardware components may mean that a direct or indirect connection between hardware components is established by wire or wirelessly, so that a second hardware component is controlled by a first hardware component among the hardware components. Although illustrated based on different blocks, embodiments are not limited thereto, and some of the hardware components illustrated in FIG. 4 may be included in a single integrated circuit such as a system on a chip (SoC). The types and/or numbers of hardware components included in the wearable device 101 are not limited to those illustrated in FIG. 4. For example, the wearable device 101 may include only some of the hardware components illustrated in FIG. 4.

According to an embodiment, the processor 120 of the wearable device 101 may include a hardware component for processing data based on one or more instructions. For example, hardware components for processing data may include an arithmetic and logic unit (ALU), a floating point unit (FPU), a field programmable gate array (FPGA), and/or a central processing unit (CPU). The number of processors 120 may be one or more. For example, the processor 120 may have a structure of a multi-core processor such as a dual core, a quad core, or a hexa core. The processor 120 of FIG. 4 may include the processor 120 of FIG. 1.

According to an embodiment, the cameras 410 and 420 of the wearable device 101 may include one or more optical sensors (e.g., a charged coupled device (CCD) sensor, a complementary metal oxide semiconductor (CMOS) sensor) that generate an electrical signal representing the color and/or brightness of light. A plurality of optical sensors included in the cameras 410 and 420 may be disposed in the form of a 2-dimensional array. The cameras 410 may correspond to light reaching the optical sensors of 2-dimensional array and generate an image including a plurality of pixels arranged in 2-dimensional, by obtaining the electrical signals of each of the plurality of optical sensors substantially simultaneously. For example, photo data captured using the cameras 410 and 420 may mean one image obtained from the cameras 410 and 420. For example, video data captured using the cameras 410 and 420 may refer to sequence of a plurality of images obtained along the designated frame rate from the cameras 410 and 420. According to an embodiment, the wearable device 101 may be disposed in a direction in which the cameras 410 and 420 receive light, and may further include a flashlight for outputting light in the direction. As described above with reference to FIGS. 2A and 2B and/or 3A and 3B, the number of cameras 410 and 420 included in the wearable device 101 may be one or more. For example, the wearable device 101 may further include a camera for identifying one of the body parts of the user wearing the wearable device 101. For example, the camera may be disposed in a direction different from that of the cameras 410 and 420. For example, the wearable device 101 may obtain user's gaze information using the camera. Based on obtaining the user's gaze information, the wearable device 101 may adjust resolutions included in image data representing a screen to be displayed through the display 450 described later. For example, the resolutions may be adjusted based on the number of pixels included in frames obtained from the at least one of the cameras 410 and 420. An operation of adjusting the resolution by the wearable device 101 based on obtaining gaze information of the user will be described later with reference to FIG. 9.

According to an embodiment, the at least one of the cameras 410 and 420 of the wearable device 101 may include a depth camera. The depth camera may include a flashlight and/or an infrared diode that emits light to the outside. The depth camera may include one or more infrared light sensors detecting intensity of infrared light. The depth camera may measure a degree to which infrared light emitted from the infrared diode is reflected, by using the one or more infrared light sensors. In an embodiment, the degree to which the infrared light is reflected may be measured substantially simultaneously by a plurality of infrared light sensors in the depth camera. The depth camera may generate frame data including a depth value, based on the degree of reflection of the infrared light measured by the plurality of infrared light sensors. The depth value may be related to a distance between the cameras 410 and 420 and subject captured by the at least one of the cameras 410 and 420. For example, the wearable device 101 may obtain at least one image data based on a distance between at least one of the subject and the cameras 410 and 420 and/or the wearable device 101.

For example, the processor 120 may identify information on each of pixels included in the obtained at least one image data. Based on the identified information, the processor 120 may obtain information on the object (or subject) included in the image, and/or posture information of the wearable device 101. An operation in which the wearable device 101 obtains the at least one image data will be described later with reference to FIGS. 6 to 7.

In an embodiment, FoV of each of the cameras 410 and 420 may be different from each other. For example, the FoV of each of the cameras 410 and 420 is an area where the lens of the cameras 410 and 420 is formed based on a view angle capable of receiving light, and may correspond to an area corresponding to an image generated by each of the cameras 410 and 420. Hereinafter, the subject and/or external object refers to an object included in the FoV of each of the cameras 410 and 420 and distinguished from the wearable device 101. The cameras 410 and 420 may include the camera module 180 of FIG. 1.

According to an embodiment, the processor 120 may obtain images based on the FoV of each of the cameras 410 and 420. For example, the processor 120 may identify the first frames using the first camera 410. For example, the processor 120 may obtain second frames using the second camera 420. For example, the processor 120 may identify at least one information (e.g., information on each pixel) included in the first frames. For example, the processor 120 may map the FoV of the first camera 410 and the FoV of the second camera 420. The processor 120 may perform sampling on the second frames using the at least one information included in the first frames, based on mapping the FoV of each of the cameras 410 and 420. For example, the processor 120 may adjust resolution of each of areas of at least one of the second frames based on the sampling. The processor 120 may generate a screen to be displayed on the display 450 using the renderer 540 to be described later, based on the adjusted resolutions. The processor 120 may display the generated screen on the display 450. The processor 120 may reduce power for driving the renderer 540 by adjusting the resolutions. An operation in which the processor 120 maps the FoV of each of the cameras 410 and 420 will be described later in FIG. 8.

According to an embodiment, the display 450 of the wearable device 101 may output visualized information to a user. The number of displays 450 included in the wearable device 101 may be one or more. For example, the display 450 may be controlled by the processor 120 and/or a graphical processing unit (GPU) to output visualized information to the user. The display 450 may include a flat panel display (FPD) and/or an electronic paper. The FPD may include a liquid crystal display (LCD), a plasma display panel (PDP), a digital mirror device (DMD), one or more light emitting diodes (LEDs), and/or micro LEDs. The LED may include an organic LED (OLED). The display 450 of FIG. 4 may include the display module 160 of FIG. 1.

For example, the processor 120 may display an image obtained through at least one of the cameras 410 and 420 through the display 450. For example, the wearable device 101 may identify information on external objects included in the image and/or information (e.g., classification information) on differences between pixels included in the image, by using data on external objects that may be obtained using a sensor 470 to be described later. The areas of the image may be referred to as a grid. For example, the processor 120 may identify the information based on a grid for distinguishing areas of the image. For example, the processor 120 may control the resolutions of each of the areas of the image based on the identification of the information. An operations in which the processor 120 obtains the information and uses the obtained information to control the resolution of each of the areas will be described later with reference to FIGS. 6 to 9.

Although not illustrated, the wearable device 101 may include other output means for outputting information in other forms than visual forms and auditory forms. For example, the wearable device 101 may include at least one speaker for outputting audio signals and/or a motor (or actuator) for providing haptic feedback based on vibration.

According to an embodiment, the sensor 470 of the wearable device 101 may generate electrical information that may be processed by the processor 120 and/or memory (not illustrated) from non-electronic information related to the wearable device 101. The electrical information generated by the sensor 470 may be stored in memory, processed by the processor 120, or transmitted to another electronic device distinct from the wearable device 101. An embodiment of the wearable device 101 is not limited to the type and/or number of one or more sensors illustrated in FIG. 4. For example, the sensor 470 may further include a grip sensor that may identify contact between the wearable device 101 and an external object (e.g., a user), and/or a gyro sensor or an acceleration sensor that can identify a movement of the wearable device 101.

For example, the wearable device 101 may identify the movement of the wearable device 101 using the sensor 470. For example, the wearable device 101 may identify acceleration by using the acceleration sensor (not illustrated). The acceleration may be a vector based on a direction and/or magnitude of net force applied to the wearable device 101. For example, the acceleration may be a vector representing a change in speed of the wearable device 101 due to the net force. The net force applied to the wearable device 101 may include gravity or a combination of other forces distinguished from the gravity. According to an embodiment, the acceleration sensor of wearable device 101 may identify rotation of the acceleration sensor based on one or more axes. For example, the acceleration sensors included in the wearable device 101 may be one or more. According to an embodiment, the wearable device 101 may identify the movement of the wearable device 101 based on the acceleration and/or rotation identified by each of the acceleration sensors.

For example, the wearable device 101 may identify head tracking based on identifying the movement of the wearable device 101 by using the sensor 470. For example, the wearable device 101 may initiate execution of at least one function based on the identified head tracking. For example, the at least one function may mean controlling resolution of the screen obtained from at least one of the cameras 410 and 420. For example, the processor 120 may identify the rotation of the wearable device 101, which is greater than or equal to the designated speed. Based on identifying the rotation, the processor 120 may lower resolution corresponding to the screen obtained from at least one of the cameras 410 and 420 at least temporarily. An operation in which the processor 120 controls the resolution by identifying the rotation of the wearable device 101 above the designated speed will be described later with reference to FIG. 11.

As described above, according to an embodiment, the wearable device 101 may obtain at least one data using cameras 410 and 420 and/or sensor 470. The at least one data may include at least one of information on one or more subjects included in the image data, posture information of the wearable device 101, gaze information of the user wearing the wearable device 101, or information on pixels. For example, the processor may obtain the at least one data based on the time point at which each of the information is obtained. For example, the wearable device 101 may control resolution of each of areas of at least one frame of the frames obtained from the camera (e.g., the cameras 410 and 420) using the at least one data. The wearable device 101 may reduce a difference between a time obtaining the at least one data and a time displaying a screen based on the controlled resolutions through the display 450, by controlling the above resolutions. By reducing the difference in time, the wearable device 101 may provide more realistic virtual reality to the user of the wearable device 101.

Figure 5:
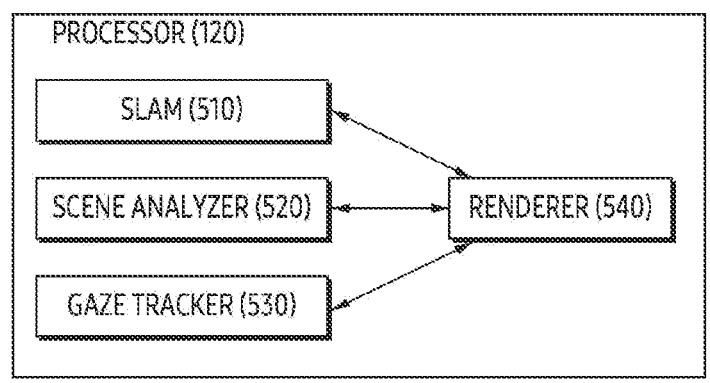
FIG. 5 is a block diagram of a processor of a wearable device, according to an embodiment of the disclosure.

FIG. 5 is a block diagram of a processor of a wearable device, according to an embodiment of the disclosure. The processor 120 of FIG. 5 may be referred to the processor 120 of the wearable device 101 of FIG. 4. Referring to FIG. 5, the processor 120 may use one or more software. For example, the one or more software may be stored in an executable format by the processor 120. For example, the type and/or number of one or more software available to the processor 120 is not limited to that illustrated in FIG. 5.

According to an embodiment, the processor 120 may obtain posture information of the wearable device 101 by using simultaneous localization and mapping (SLAM) 510. For example, the processor 120 may obtain frames based on the FoV of the first camera from the first camera (e.g., the first camera 410 of FIG. 4). For example, the frames may be an example of a monochrome image. For example, the processor 120 may identify classification information representing a difference between each of pixels included in the frames. The classification information may include information on one or more subjects included in the frames, edge information, texture information, shade information, and/or depth information. For example, the processor 120 may obtain the classification information from each of the areas included in the FoV. The number of classification information included in each of the areas may be different. An operation in which the wearable device 101 divides the areas will be described later in FIG. 8.

For example, the processor 120 may identify the movement of the wearable device 101 using a sensor (e.g., the sensor 470 of FIG. 4) while identifying the classification information. For example, the processor 120 may obtain posture information of the wearable device 101 based on the classification information and/or identifying the movement of the wearable device 101. The posture information may include information on a space of the wearable device 101. For example, the posture information may include spatial information in which the wearable device 101 and/or each of external objects different from the wearable device 101 included in the space are disposed. A period in which each of external objects, classification information and posture information of the wearable device 101 is identified by the processor 120 may be different. For example, according to a period in which each of external objects is identified by the processor 120, at least one of the classification information and the posture information of the wearable device 101 may be used for an operation performed by the processor 120 based on the renderer 540. However, it is not limited thereto.

According to an embodiment, the processor 120 may identify segmentation information for dividing portions included in the first frames obtained through the first camera (e.g., the first camera 410 of FIG. 4) using the scene analyzer 520 (e.g., scene understanding (SU)). For example, the portions may refer to portions in which one or more external objects (e.g., desks, chairs, or beds) included in the first frames are disposed. For example, the one or more external objects may be configured with one or more segments. The segment may be identified based on information obtained based on hardware (e.g., neural processing unit (NPU), and/or graphic processing unit (GPU)) for performing artificial intelligence-related operations, software for providing functions related to artificial intelligence, and/or external electronic devices (e.g., a server that provides functions related to the artificial intelligence).

For example, one or more segments may be used to recognize one or more external objects (or subjects) included in the first frames obtained through the first camera. For example, one or more segments may be referred to preprocess information of an image processed based on the renderer 540 of FIG. 5. For example, the processor 120 may identify segmentation information using parts in which the one or more segments are disposed. However, it is not limited thereto.

For example, the processor may obtain segmentation information corresponding to each of the areas of the FoV of the first camera. The segmentation information corresponding to each of the areas may be different, respectively. For example, the number of one or more external objects disposed in each of the areas may be different from each other. The segmentation information may be used in an operation performed by the processor 120 based on the renderer 540.

According to an embodiment, the processor 120 may obtain gaze information of the user wearing the wearable device 101 using a gaze tracker 530. For example, the gaze information of the user may be identified using a gaze tracking camera 260-1 of FIG. 3B. For example, the processor 120 may identify an area of a screen displayed on a display (e.g., the display 450 of FIG. 4) matching the user's gaze represented by the user's gaze information. For example, the user's gaze information may include data on the area. The gaze information may be used in an operation performed by the processor 120 based on the renderer 540.

For example, the processor 120 may control at least a part of the resolutions of the image obtained from the camera, by using classification information obtained using the SLAM 510, segmentation information obtained using the scene analyzer 520, and/or user gaze information obtained using the gaze tracker 530. For example, periods in which the classification information, the segmentation information, and the gaze information are obtained may be different. Based on the period, the processor 120 may obtain at least one of the information. An operation in which the processor 120 obtains at least one of the information based on the period will be described later in FIG. 10.

According to an embodiment, the processor 120 may render a screen to be displayed by a display (e.g., the display 450 of FIG. 4) by using renderer 540. For example, the processor 120 may generate a screen corresponding to frames obtained using the second camera (e.g., the second camera 420 of FIG. 4). For example, the screen may include one or more external objects corresponding to each of one or more subjects included in the frames. A position where the one or more external objects are disposed in the screen may be substantially similar to a position where the one or more subjects disposed in the frames are disposed. The type of one or more external objects may be identified based on the one or more subjects corresponding to the one or more external objects. However, it is not limited thereto.

For example, the screen may include information on resolution. For example, the processor 120 may obtain second frames using the second camera (e.g., the second camera 420 of FIG. 4). For example, the second frames may include color information based on an RGB channel. For example, the second frames may include at least a part of the information on one or more subjects included in the first frames obtained using the first camera (e.g., the first camera 410 of FIG. 4).

For example, the first frames and the second frames may be obtained based on different FoV, respectively. For example, the processor 120 may change one of the first FoV corresponding to the first frames and the second FoV corresponding to the second frames. For example, the processor may use at least one data (e.g., mapping data) included in a memory (not shown) to change one of the first FoV and/or the second FoV. By changing the first FoV and/or the second FoV, the at least one information (e.g., classification information, segmentation information, and/or gaze information) included in the first frames may be mapped as the second frames.

For example, the processor 120 may set resolution corresponding to each of the areas of the second FoV based on mapping the information into the second frames. For example, resolutions corresponding to each of the areas of the second FoV may be different from each other. For example, the processor 120 may adjust the resolution of each of the areas, in proportion to the number of feature points indicated by classification information and/or the number of external objects indicated by segmentation information, included in each of the areas. For example, the processor 120 may adjust the resolution of an area matching the user gaze indicated by the user gaze information.

For example, the processor 120 may render a screen using the renderer 540 based on setting resolutions corresponding to each of the areas of the second FoV. The processor 120 may display the rendered screen on the display. The resolutions of each of the areas included in the displayed screen may be different from each other. The processor 120 may reduce the power consumed to drive the renderer 540 by setting resolutions corresponding to each of the areas.

For example, the processor 120 may control at least a part of the pixels included in each of the areas to adjust the resolutions of each of the areas. The processor 120 may obtain the screen by using at least a part of the pixels included in the screen corresponding to each of the areas. For example, the processor 120 may perform sampling on each of the areas based on adjusted resolutions. Based on the sampling, the resolution of the screen generated by the renderer (e.g., the renderer 540 in FIG. 5) may be different based on areas matching the screen.

As described above, according to an embodiment, the wearable device 101 may adjust the resolutions of each area of the image obtained from the camera using information obtained through the camera and/or the sensor. By adjusting the resolutions, the wearable device 101 may reduce a time for rendering an image obtained through a camera. By reducing the time for rendering, power consumption of a battery (not illustrated) included in the wearable device 101 may be reduced. By reducing the power consumption, the wearable device 101 may provide a service for virtual reality to the user for a longer time.

Figure 6:
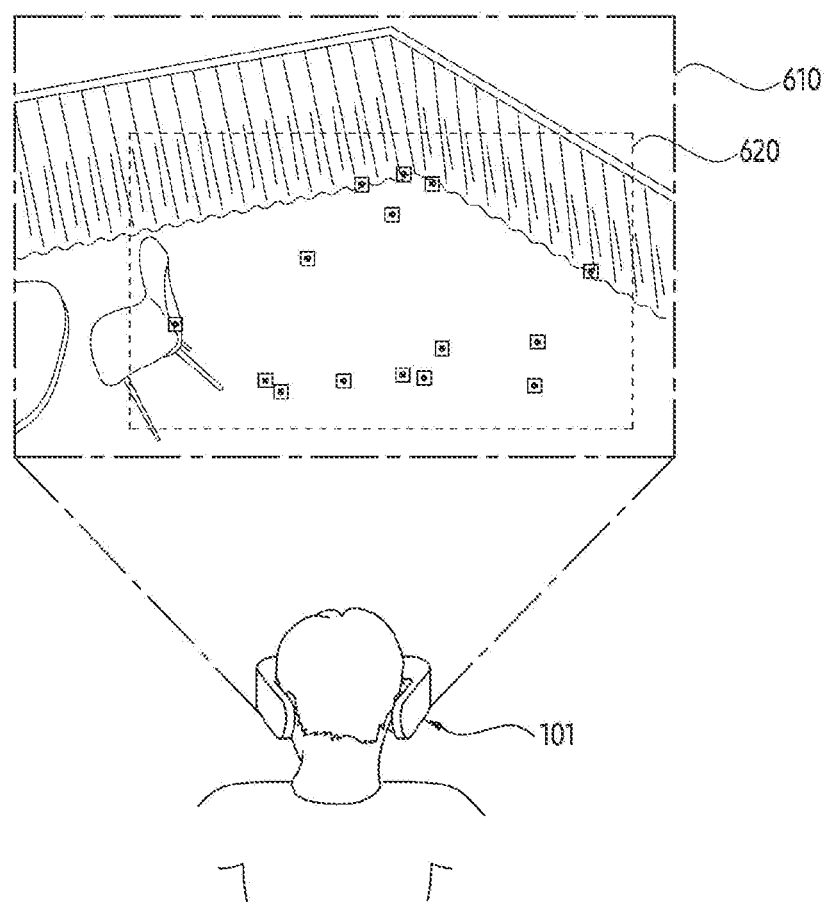
FIG. 6 is a diagram illustrating an operation in which a wearable device obtains feature points in a frame obtained by using a camera, according to an embodiment of the disclosure.

FIG. 6 is a diagram illustrating an operation in which a wearable device obtains feature points in a frame obtained by using a camera, according to an embodiment of the disclosure. The wearable device 101 of FIG. 6 may be an example of the electronic device 101 of FIG. 1 and/or the wearable device 101 of FIG. 4. Referring to FIG. 6, image data 610 obtained using a first camera (e.g., the first camera 410 of FIG. 4) included in the wearable device 101 is illustrated.

According to an embodiment, the wearable device 101 may identify classification information included in the obtained frames using the first camera based on the SLAM 510 of FIG. 5. For example, the wearable device 101 may set resolution of a screen obtained based on the frames using the identified classification information. For example, the wearable device 101 may obtain classification information included in image data 610 using the first camera. For example, the image data 610 may be obtained based on the FoV of the first camera. For example, the image data 610 may be one of areas included in frames obtained based on the FoV of the first camera. The classification information may include a result of classifying the pixels based on differences between the pixels included in the image data 610. For example, the wearable device 101 may identify differences between the pixels based on identifying an edge, a texture, a shade, and/or a corner included in the image data 610. For example, the wearable device 101 may identify the result of classifying the pixels as feature points 620.

For example, according to an embodiment, the wearable device 101 may identify the number of the feature points 620 included in the image data 610. For example, the wearable device 101 may change information on resolutions included in the image data 610 using the image data 610, based on identifying the number of the feature points 620. For example, the wearable device 101 may set the resolutions of each area of the screen corresponding to the image data 610 in proportion to the number of the feature points 620. For example, the wearable device 101 may set the resolution of each area of the screen corresponding to the image data 610 to high, based on identifying the number of the feature points 620 that are above the designated threshold. For example, the wearable device 101 may set the resolution of each areas of the screen corresponding to the image data 610 to low, based on identifying the number of the feature points 620 that are less than the designated threshold. For example, the wearable device 101 may set the resolution of the screen to low, based on down sampling of pixels included in the screen corresponding to the image data 610. For example, the wearable device 101 may adjust the number of pixels based on the down sampling. The wearable device 101 may adjust the resolution by adjusting the number of pixels. However, it is not limited thereto. For example, the wearable device 101 may change the resolutions of each areas of the image obtained from the camera, based on information (e.g., a distance information between an external object and the wearable device 101) obtained using at least one sensor (e.g., the depth sensor), independently of identifying the number of the feature points 620 included in the image data 610. For example, when the distance between the external object and the wearable device 101 that is greater than or equal to the threshold is identified, the wearable device 101 may reduce the resolution corresponding to at least one of the areas of the image.

According to an embodiment, the wearable device 101 may identify posture information of the wearable device 101 using the obtained classification information. For example, the wearable device 101 may identify the posture information using the image obtained from the camera and/or the sensor (e.g., inertial measurement unit (IMU) sensor, and/or time-of-flight (ToF) sensor) 470 of FIG. 4. For example, the wearable device 101 may obtain information on surrounding environment of the wearable device 101 using the classification information included in the image data 610. For example, the wearable device 101 may use sensors to identify a positional relationships with one or more external objects included in the surrounding environment and distinguished from the wearable device 101. The positional relationship may include information on a distance between the wearable device 101 and each of the one or more external objects using the depth sensor. However, it is not limited thereto. According to an embodiment, the wearable device 101 may identify information on the distance between the wearable device 101 and each of the one or more external objects included in the image obtained from the camera, by using the SLAM 510 of FIG. 5. For example, the wearable device 101 may identify the information on the distance based on disparity between images obtained using a plurality of cameras included in the wearable device 101. For example, the disparity between the images may refer to a difference between a first image and a second image obtained by projecting the first image among the images into the second image among the images.

For example, the wearable device 101 may obtain the posture information of the wearable device 101 based on the classification information and/or the positional relationship. For example, the posture information may include information on a pose of a user wearing the wearable device 101. For example, the user's pose may refer to a position of a part of the user's body part (e.g., head).

According to an embodiment, the wearable device 101 may identify a rotation of the wearable device 101 based on identifying the posture information of the wearable device 101. For example, based on identifying a rotation below the designated speed, the wearable device 101 may use the classification information to adjust the resolution of each of the areas included in the screen rendered using a renderer. Based on identifying the rotation above the designated speed, the wearable device 101 may set the resolution of all areas included in the screen to low, independently of using the classification information. For example, the wearable device may change the resolution to resolution smaller than a designated resolution in order to set the resolution low. However, it is not limited thereto.

As described above, according to an embodiment, the wearable device 101 may obtain first frames using the first camera (e.g., the first camera 410 of FIG. 4). In a state of identifying the rotation of the wearable device 101 below the designated speed, the wearable device 101 may identify the number of the feature points based on identifying a difference between the pixels included in the first frames. The number of identified feature points may be different, according to each of the areas of the first frames. The wearable device 101 may change the resolution of the screen to be processed by using a renderer (e.g., the renderer 540 in FIG. 5) based on the number of the feature points. The changed resolutions may be different according to the areas of the screen corresponding to the areas. For example, the wearable device 101 may render a first area including a relatively low number of the feature points among areas of the screen, based on a smaller resolution than other areas distinguished from the first area among the areas of the screen. The wearable device 101 may reduce motion to photons (MTP) latency by setting the resolution of each of the areas of the screen rendered based on the number of the feature points included in the image data obtained through the first camera.

Figure 7:
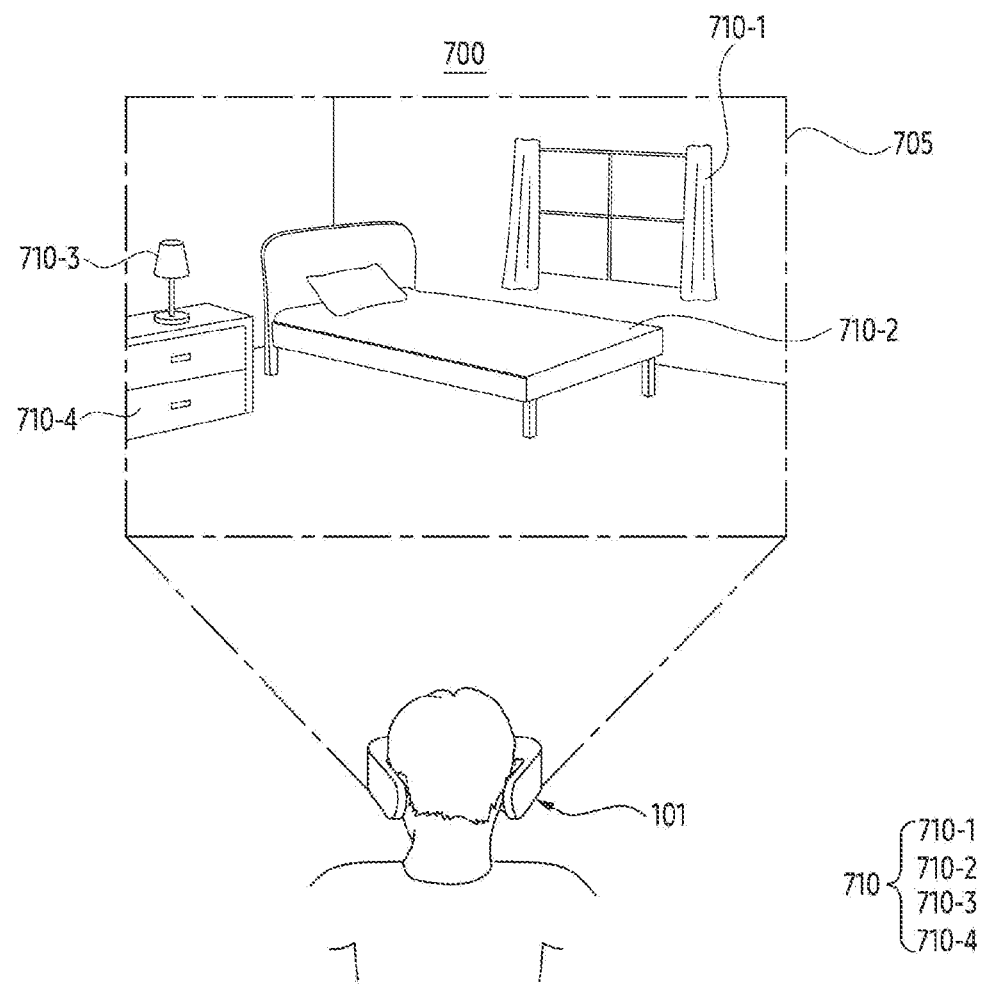
FIG. 7 is a diagram illustrating an operation in which a wearable device identifies an external object in a frame obtained by using a camera, according to an embodiment of the disclosure.

FIG. 7 is a diagram illustrating an operation in which a wearable device identifies an external object in a frame obtained by using a camera, according to an embodiment of the disclosure. The wearable device 101 of FIG. 7 may be an example of the electronic device 101 of FIG. 1 and/or the wearable device 101 of FIG. 4. Referring to FIG. 7, a state 700 for the wearable device 101 to distinguish one or more subjects from image data 705 obtained using the first camera 410 of FIG. 4 is shown.

Referring to FIG. 7, in a state 700, according to an embodiment, the wearable device 101 may obtain the image data 705 using the first camera (e.g., the first camera 410 of FIG. 4). For example, the image data 705 may include one or more subjects 710. For example, the wearable device 101 may generate a screen to be displayed by a display (e.g., the display 450 in FIG. 4) and corresponding to image data 705, by using information on the one or more of subjects 710. The screen may include one or more external objects corresponding to each of the one or more subjects 710.

According to an embodiment, the wearable device 101 may obtain segmentation information using the scene analyzer 520 of FIG. 5 within the image data 705. For example, the segmentation information may refer to information for segmenting a captured part of the one or more subjects 710 in a space including the wearable device 101 based on the image data 705. For example, the segmentation information may include information for grouping pixels included in the image data 705. The wearable device 101 may classify the one or more subjects 710 included in the image data 705 using the segmentation information. The wearable device may obtain the number of the one or more subjects 710 based on classifying the one or more subjects 710. The number of the one or more subjects 710 included in each of the areas of the image data 705 may be different. For example, the segmentation information may include information on the number of the one or more subjects 710 corresponding to each of the areas.

According to an embodiment, the wearable device 101 may set the resolution of the screen based on identifying the number of the one or more subjects included in each of the areas. The set resolution may be different according to the areas of the screen. For example, the wearable device 101 may set the resolution in proportion to the number of the one or more subjects included in each of the areas. For example, although not illustrated, the first area of the areas may include a first subject 710-1 and a second subject 710-2. The second area of the areas may include a third subject 710-3 and/or a fourth subject 710-4. The screen may be generated in the first area having a relatively large number of the areas, based on the resolution larger than the second areas having a relatively small number. However, it is not limited thereto.

According to an embodiment, the wearable device 101 may measure a distance between the wearable device 101 and the one or more subjects 710 based on the sensor 470 (e.g., depth sensor) of FIG. 4. For example, the wearable device 101 may identify a first distance between the first subject 710-1 and the wearable device 101. The wearable device 101 may identify a second distance between the fourth subject 710-4 and the wearable device 101. For example, the first distance may correspond to a value relatively larger than the second distance. For example, the first subject 710-1 may be included in the first area among a plurality of areas included in the image data 705. The fourth subject 710-4 may be included in the second area among the plurality of areas included in the image data 705. The wearable device 101 may change the resolution corresponding to the first area and/or the second area based on identifying the first distance and the second distance. For example, the resolution corresponding to the first area may have a value equal to or less than the resolution corresponding to the second area.

As described above, according to an embodiment, the wearable device 101 may obtain the segmentation information for segmenting the one or more subjects 710 included in the image data 705, by using the scene analyzer 520. Based on the segmentation information, the wearable device 101 may identify the number of the one or more subjects 710 included in each of the areas of the image data 705. In proportion to the number of the one or more subjects 710, the wearable device may adjust resolution of a screen generated using a renderer (e.g., the renderer 540 in FIG. 5) based on the image data 705. The adjusted resolution may be different according to each of the areas of the screen. The wearable device 101 may improve the user's experience with virtual reality by adjusting the resolution of each of the areas of the screen differently.

Figure 8:
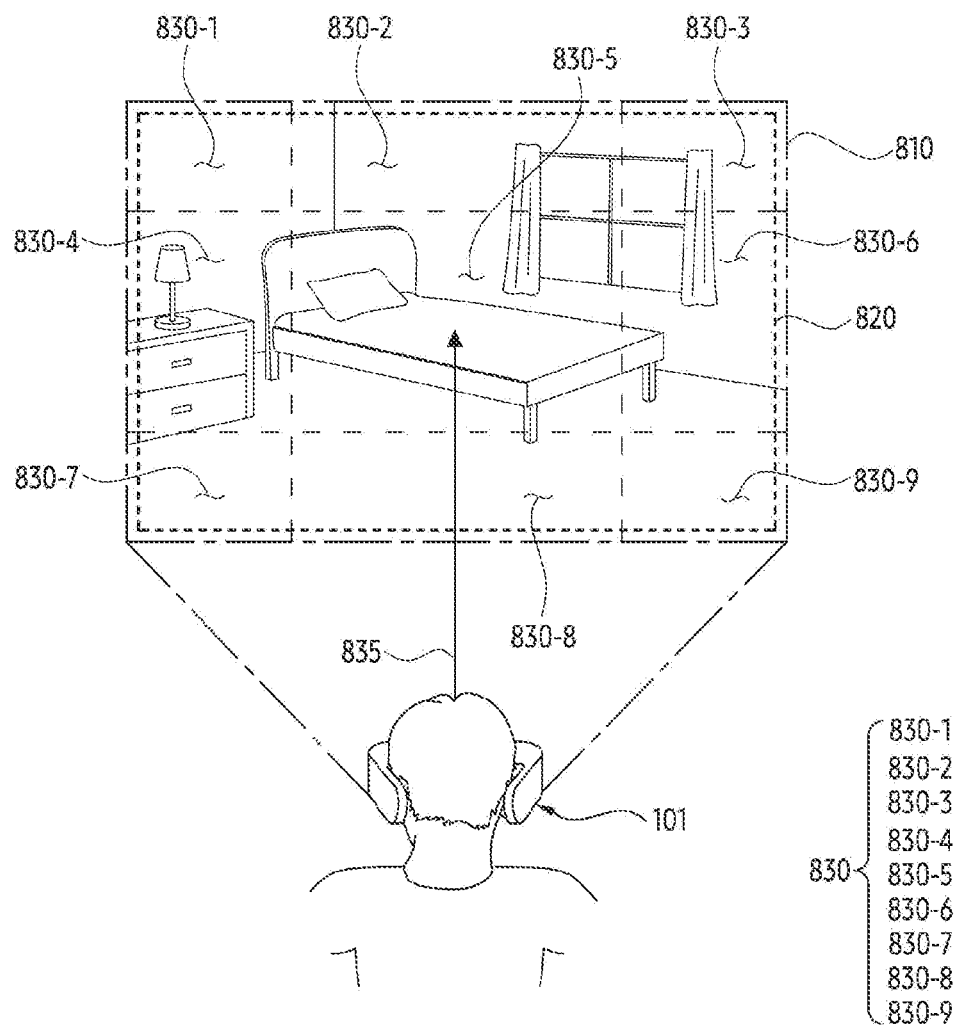
FIG. 8 is a diagram illustrating an operation in which a wearable device matches FoV of each of a plurality of cameras, according to an embodiment of the disclosure.

FIG. 8 is a diagram illustrating an operation in which a wearable device matches FoV of each of a plurality of cameras, according to an embodiment of the disclosure. The wearable device 101 of FIG. 8 may be referred to the electronic device 101 of FIG. 1 and/or the wearable device 101 of FIG. 4. Referring to FIG. 8, according to an embodiment, the wearable device 101 may obtain frames based on FoV of each of cameras (e.g., the cameras 410 and 420 of FIG. 4) by using the cameras.

According to an embodiment, the wearable device 101 may obtain frames 820 based on the first FoV of the first camera 410 of FIG. 4. The frames 820 may include areas 830. The number, size, and/or position of areas 830 included in the frames 820 are not limited to those illustrated in FIG. 8. For example, the wearable device 101 may identify classification information, posture information of the wearable device, and/or segmentation information included in frames 820, based on obtaining the frames 820, using the SLAM 510 of FIG. 5 and the scene analyzer 520 of FIG. 5. Based on the identified information, the wearable device 101 may set resolutions corresponding to each of the areas.

According to an embodiment, the wearable device 101 may obtain frames 810 based on the second FoV of the second camera 420 of FIG. 4. The wearable device 101 may map frames 810 and frames 820, by using mapping data stored in memory. For example, the wearable device 101 may map each of the areas 830 for distinguishing the frames 820 to the frames 810, based on mapping the frames 810 and 820. As each of the areas 830 is mapped to the frames 810, the wearable device 101 may map one or more information (e.g., classification information, and/or segmentation information) included in each of the areas 830 to the frames 810. The wearable device 101 may perform sampling on the frames 810 based on mapping one or more of the information to the frames 810. The wearable device 101 may obtain a screen based on the frames 810, by using the renderer 540 of FIG. 5, based on performing the sampling. The wearable device 101 may display the screen on which sampling is performed on the display.

According to an embodiment, the wearable device 101 may obtain gaze information of a user wearing the wearable device 101, by using the sensor 470 of FIG. 4 and/or the gaze tracking camera 260-1 of FIG. 3B. For example, the wearable device 101 may identify an area 830-5 matched the user's gaze 835 indicated by the gaze information, based on obtaining the gaze information. For example, the area 830-5 may be an example of an area overlapping a direction of the gaze 835 of the user. For example, the wearable device 101 may adjust resolution corresponding to the area 830-5 based on identifying the user's gaze 835.

For example, the adjusted resolution may be changed to resolution larger than resolution corresponding to areas different from the area 830 among the areas 830.

According to an embodiment, the wearable device 101 may identify a time and/or number of times the user's gaze 835 is matched to each of the areas 830 using the user's gaze information. The wearable device 101 may adjust resolutions corresponding to each of the areas 830 based on identifying the time and/or number of times. For example, the time and/or the number corresponding to areas 830-1, 830-3, 830-7, and 830-9 may be relatively less than the time and/or the number corresponding to areas 830-2, 830-4, 830-6, and 830-8. The wearable device 101 may change the first resolution corresponding to the areas 830-1, 830-3, 830-7, and 830-9 to a smaller resolution than the second resolution corresponding to the areas 830-2, 830-4, 830-6, and 830-8. However, it is not limited thereto.

According to an embodiment, the wearable device 101 may control a period for adjusting resolutions corresponding to each of the areas 830 using the user's gaze information. For example, a first period for adjusting the resolution corresponding to the area 830-5 matching the user's gaze 835 may have a greater value than the second period for adjusting the resolution corresponding to each of the other areas different from the areas 830-5. For example, the wearable device 101 may change the resolution corresponding to the area 830-5 based on the first period while changing the resolution corresponding to each of the areas based on the second period. For example, by changing the resolution corresponding to the area 830-5 based on the first period, the wearable device 101 may enhance the user experience for virtual reality.

As described above, the wearable device 101 may adjust resolutions corresponding to each of the areas included in the frames, by mapping a plurality of frames based on different FoV and/or different resolutions. For example, based on adjusted resolutions, the wearable device 101 may perform sampling to display a screen related to the frames on the display. The screen may include information on one or more subjects included in the frames. The screen may be displayed in the display based on resolutions corresponding to each of the areas. The wearable device 101 may reduce MTP latency by adjusting resolutions for the screen. The wearable device may provide a more comfortable virtual reality service to a user based on reducing the MTP latency.

Figure 9:
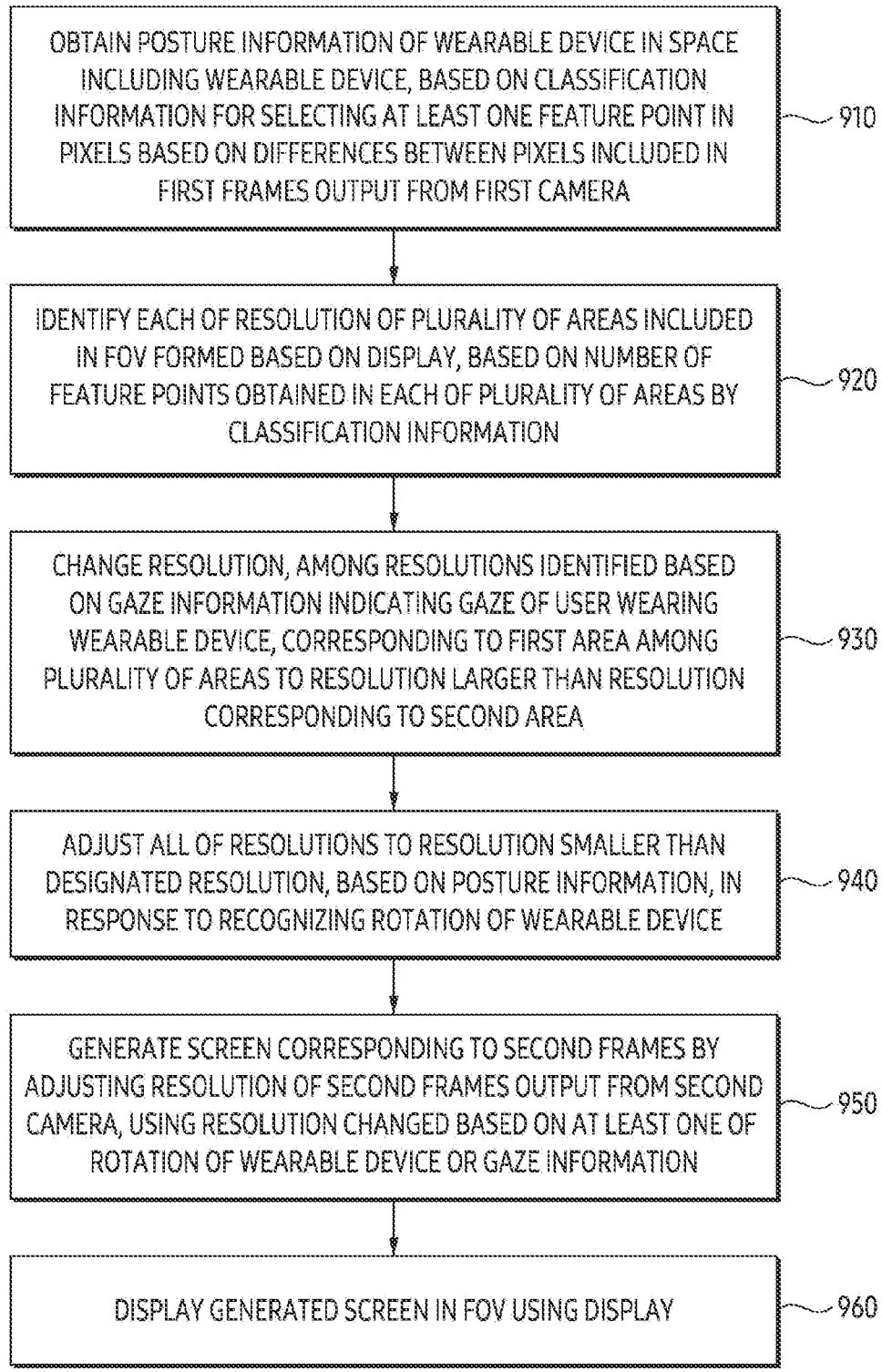
FIG. 9 is a flowchart illustrating an operation in which a wearable device sets resolution of each of areas included in FoV, by using one or more information, according to an embodiment of the disclosure.

FIG. 9 is a flowchart illustrating an operation in which a wearable device sets resolution of each of areas included in FoV, by using one or more information, according to an embodiment of the disclosure. At least a part of the operations of FIG. 9 may be performed by the processor 120 of the electronic device 101 of FIG. 1 and/or the wearable device 101 of FIG. 4.

Referring to FIG. 9, in operation 910, according to an embodiment, the processor may obtain posture information of the wearable device in a space including the wearable device, based on classification information for selecting at least one feature point in pixels based on differences between pixels included in the first frames output from the first camera 410 of FIG. 4. For example, the processor may identify posture information of the wearable device based on SLAM 510 of FIG. 5. The processor may identify rotation of the wearable device based on identifying posture information of the wearable device. The processor may perform operation 920 based on identifying the rotation of the wearable device less than the designated speed. A state in which the wearable device identifies rotation of the wearable device higher than the designated speed will be described later in FIG. 11.

Referring to FIG. 9, in operation 920, according to an embodiment, the processor may include an operation of identifying each of resolution of a plurality of areas included in a field-of-view (FoV) formed based on the display, based on the number of the feature points obtained in each of the plurality of areas by classification information. For example, using the classification information, the processor may identify the number of the feature points included in each of a plurality of areas. The processor may identify the resolutions in proportion to the number of the feature points.

For example, the processor may obtain segmentation information for segmenting at least one part in which at least one external object included in the space is captured within the first frames based on the scene analyzer 520 of FIG. 5.

For example, the processor may identify the number of the at least one external object based on the segmentation information. For example, the processor may identify resolutions in proportion to the number of the at least one identified external object.

Referring to FIG. 9, in operation 930, according to an embodiment, the processor may change resolution corresponding to the first area among the plurality of areas to resolution larger than resolution corresponding to the second area, among the resolutions identified based on the gaze information indicating the gaze of the user wearing the wearable device. The user's gaze may be referred to the user's gaze 835 of FIG. 8. For example, the processor may obtain the gaze information using the gaze tracking camera 260-1. For example, the processor may obtain the gaze information using the gaze tracker 530 of FIG. 5. For example, the first area among the plurality of areas may be referred to the area 830-5 of FIG. 8. For example, the processor may temporarily cease sampling on the first area based on the gaze information.

Referring to FIG. 9, in operation 940, according to an embodiment, the processor may adjust all of the resolutions to resolution smaller than the designated resolution based on the posture information, in response to recognizing the rotation of the wearable device. Based on identifying the rotation of the wearable device above the designated speed, the processor may change all of the resolution to resolution smaller than the designated resolution.

For example, based on identifying the rotation of the wearable device below the designated speed, the processor may maintain resolution adjusted based on the classification information, the segmentation information, and/or the gaze information. The time point at which each of the information is obtained may be different. An operation in which the processor adjusts the resolution based on the time point at which each of the information is obtained will be described later in FIG. 10.

Referring to FIG. 9, in operation 950, according to an embodiment, the processor may generate a screen corresponding to the second frames by adjusting the resolution of the second frames output from the second camera 420 of FIG. 4, using the resolution changed based on at least one of the rotation of the wearable device or the gaze information. For example, the processor may perform mapping on the first frames and the second frames to perform sampling on the second frames (e.g., images including color information). Based on performing the mapping, the processor may map one or more information (e.g., classification information, segmentation information, and/or gaze information) included in the first frames to the second frames. As the mapping is performed, the processor may perform the sampling. The processor may reduce resolutions corresponding to each of the areas of the second frames, based on performing the sampling. For example, the processor may adjust the number of pixels included in each of the areas of the second frames to reduce the resolutions, based on performing the sampling. However, it is not limited thereto.

Referring to FIG. 9, in operation 960, according to an embodiment, the processor may display a generated screen in the FoV using the display. The processor may generate the screen based on the renderer 540 of FIG. 5. For example, the screen may be obtained based on the second frames obtained through the second camera 420 of FIG. 4. For example, the processor may reduce the power consumed to drive a renderer, based on performing sampling on each of the areas of the frames.

The screen may be an example of a screen generated by a wearable device to provide a virtual reality service to a user. For example, the FoV may be similar to the user's FoV. However, it is not limited thereto. Resolutions corresponding to each of areas included in the displayed screen may be different based on performing the sampling, respectively. As the resolutions corresponding to each of the areas are adjusted, the processor may reduce a time (e.g., MTP latency) for processing the screen, by using the renderer 540. Hereinafter, in FIG. 10, an operation of identifying resolution by a wearable device and/or a processor based on a period of information obtained using a sensor and/or a camera will be described later.

Figure 10:
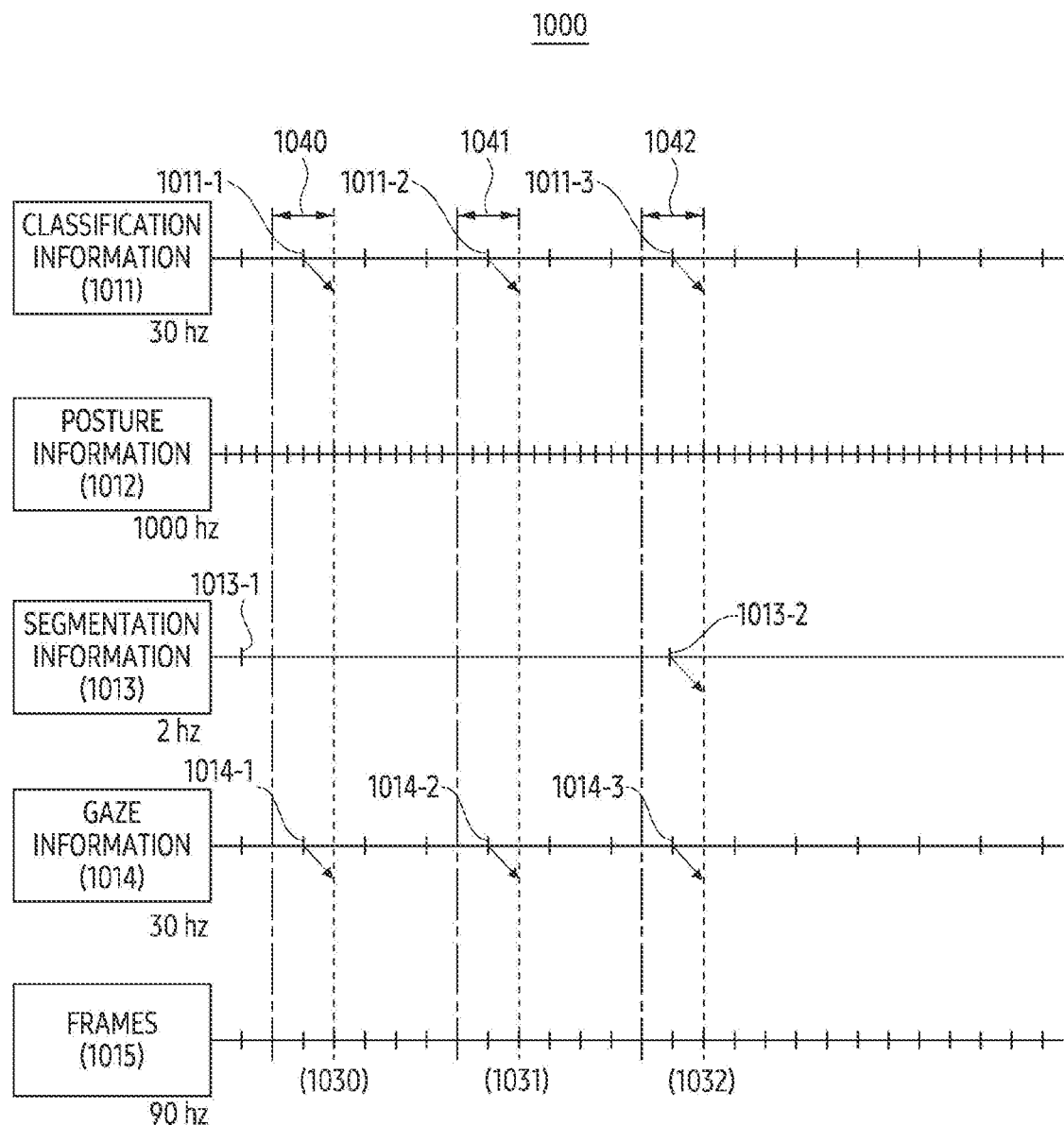
FIG. 10 is a diagram illustrating an operation in which a wearable device identifies resolutions of each of the plurality of areas, based on at least one information selected based on time points at which each of at least one information are obtained, according to an embodiment of the disclosure.

FIG. 10 is a diagram illustrating an operation in which a wearable device identifies resolutions of each of the plurality of areas, based on at least one information selected based on time points at which each of at least one information are obtained, according to an embodiment of the disclosure. The wearable device 101 of FIG. 10 may be an example of the electronic device 101 of FIG. 1 and/or the wearable device 101 of FIG. 4. Referring to FIG. 10, a timetable 1000 based on a period in which one or more information are obtained by the wearable device 101 is illustrated.

According to an embodiment, the wearable device 101 may obtain one or more information based on a designated period. The wearable device 101 may identify classification information 1011 (i.e., 1011-1, 1011-2, and 1011-3 in FIG. 10), based on a designated first period (e.g., 30 hz). For example, the classification information 1011 may include information indicating a difference between pixels included in an image obtained using at least one camera. The wearable device 101 may identify posture information 1012 based on a designated second period (e.g., 1000 hz). For example, the wearable device 101 may detect a rotation speed of the wearable device 101 by using the posture information 1012. For example, the wearable device 101 may obtain segmentation information 1013 (i.e., 1013-1 and 1013-2 in FIG. 10) based on a designated third period (e.g., 2 hz). The segmentation information 1013 may include information on a space including the wearable device 101. For example, the wearable device 101 may obtain gaze information 1014 (i.e., 1014-1, 1014-2, and 1014-3 in FIG. 10) for identifying the user's gaze based on a fourth designated period (e.g., 30 hz). For example, the wearable device 101 may obtain designated fifth frames 1015 based on a designated fifth period (e.g., 90 hz), by using the second camera 420 of FIG. 4.

According to an embodiment, the wearable device 101 may generate a screen based on at least one of the frames 1015, by using the renderer 540 of FIG. 5, at a first time point 1030. The wearable device 101 may identify resolutions corresponding in order to each of the areas included in the screen to display the screen on a display (e.g., the display 450 of FIG. 4). When rendering the screen (e.g., the first time point 1030), the wearable device 101 may select at least one of a plurality of information based on each of the period. For example, rendering the screen by the wearable device 101 may mean generating the screen and/or adjusting resolutions corresponding to areas included in the screen.

For example, the wearable device 101 may perform rendering to generate the screen, by using the information included in the designated threshold 1040. For example, the designated threshold 1040 may mean a time interval from a designated time point to the first time point 1030 for rendering. For example, in order to render the screen at the first time point 1030, the wearable device 101 may identify the first classification information 1011-1, information corresponding to the first time point 1030 among the posture information 1012, the first gaze information 1014-1 and information corresponding to the first time point 1030 among the frames 1015.

For example, the first classification information 1011-1 and/or the first gaze information 1014-1 may be information included within the designated threshold 1040. For example, the posture information corresponding to the first time point 1030 may include a rotation speed of the wearable device 101 less than the designated speed. For example, the first segmentation information 1013-1 may be information not included within the designated threshold 1040. For example, the wearable device 101 may temporarily refrain from identifying segmentation information 1013 while rendering the screen at the first time point 1030. For example, the wearable device 101 may generate the screen based on the first resolutions at the first time point 1030. The wearable device 101 may display the generated screen on the display.

For example, the wearable device 101 may perform rendering at a second time point 1031, based on at least one of the second classification information 1011-2, the posture information 1012 corresponding to the second time point 1031, the second gaze information 1014-2, and the frames 1015 corresponding to a second time point 1031. Based on performing the rendering, the wearable device 101 may display a screen based on the second resolution on the display. For example, the second classification information 1011-2 and/or the second gaze information 1014-2 may be information included within the designated threshold 1041 from the second time point 1031.

For example, the wearable device 101 may perform rendering at a third time point 1032, based on at least one of the third classification information 1011-3, the posture information 1012 corresponding to the third time point 1032, the second segmentation information 1013-2, the third gaze information 1014-3, and frames 1015 corresponding to the third time point 1032. Based on performing the rendering, the wearable device 101 may generate a screen based on the third resolution. For example, the third classification information 1011-3, the second segmentation information 1013-2, and/or the third gaze information 1014-3 may be information obtained within the designated threshold 1042 from the third time point 1032. However, it is not limited thereto.

According to an embodiment, the first resolution identified at the first time point 1030, the second resolution identified at the second time point 1031, and the third resolution identified at the third time point 1032 may be different from each other. For example, the first resolution may be identified based on relatively smaller resolution than the third resolution. However, it is not limited thereto.

According to an embodiment, the wearable device 101 may obtain a screen corresponding to one of the frames 1015 based on resolution less than the designated resolution, independently of identifying a plurality of information 1011, 1012, 1013, and 1014 based on identifying a rotation speed of the wearable device 101 above the designated speed by using the posture information 1012.

As described above, according to an embodiment, the wearable device 101 may obtain a plurality of information by using a sensor (e.g., the sensor 470 in FIG. 4) and/or a camera (e.g., the cameras 410 and 420 in FIG. 4). Each of the plurality of obtained information may be obtained based on different periods. The wearable device 101 may perform rendering for generating at least one screen, by using the renderer 540 of FIG. 5. The wearable device 101 may identify at least one information of a plurality of information obtained based on the different periods to perform the rendering at designated time point. The wearable device may obtain the at least one screen based on the identified at least one information. The obtained at least one screen may be obtained based on the first resolution. The wearable device 101 may display the at least one screen obtained based on the first resolution on the display. The wearable device 101 may update changes in space including the wearable device 101 through a screen shown to the user in real time, by selecting information included within the designated threshold at the rendering time point. By performing the update, the wearable device 101 may provide a virtual reality service representing interaction with a space including the wearable device 101 to the user.

Figure 11:
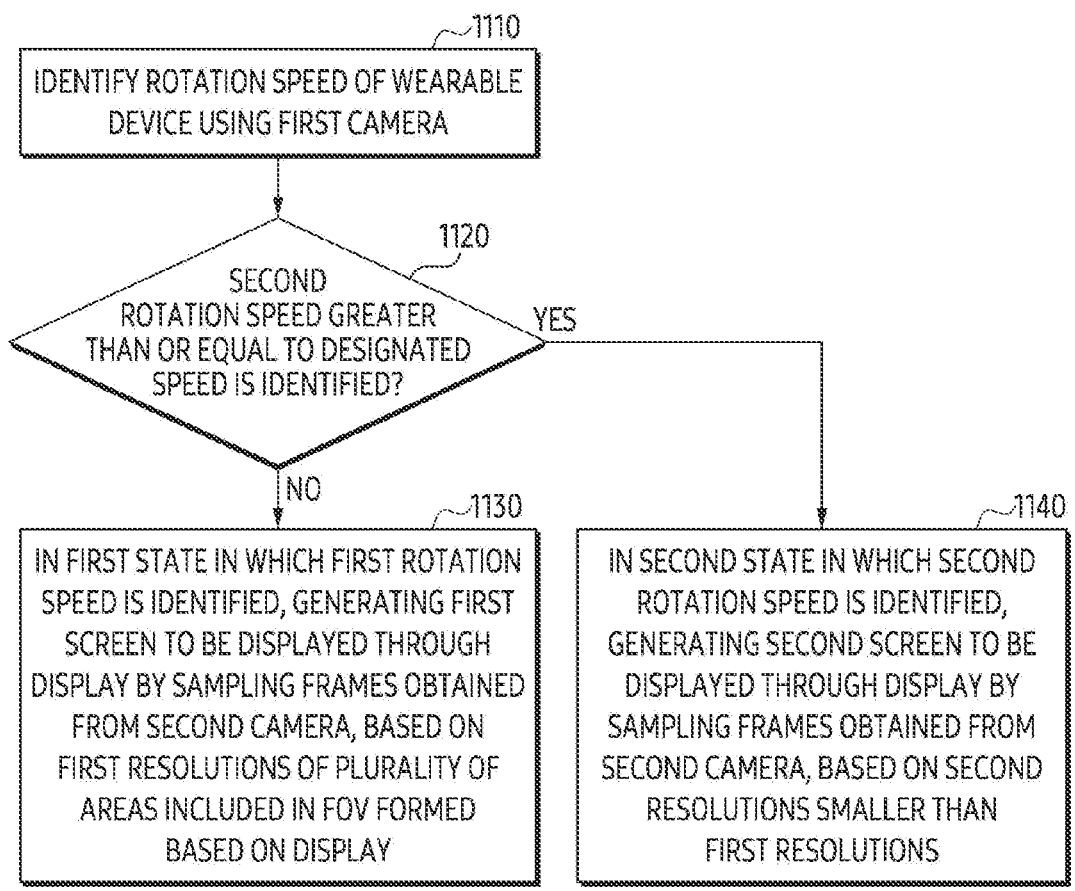
FIG. 11 is a flowchart illustrating an operation in which a wearable device generates a screen based on a rotation speed of the wearable device, according to an embodiment of the disclosure.

FIG. 11 is a flowchart illustrating an operation in which a wearable device generates a screen based on a rotation speed of the wearable device, according to an embodiment of the disclosure. At least one of operations of FIG. 11 may be performed by the electronic device 101 of FIG. 1, the wearable device 101 of FIG. 4, and/or the processor 120 of FIG. 4.

Referring to FIG. 11, in operation 1110, according to an embodiment, the processor may identify a rotation speed of the wearable device 101 using the first camera (e.g., the first camera 410 of FIG. 4). The processor may identify the rotation speed of the wearable device 101 using the posture information 1012 of FIG. 10. For example, the wearable device 101 may detect head tracking, based on identifying the movement of the wearable device 101 using the sensor 470 of FIG. 4. The wearable device 101 may identify the rotation speed based on the detected head tracking.

Referring to FIG. 11, in operation 1120, according to an embodiment, the processor may verify whether a second rotation speed that is greater than or equal to the designated speed is identified. For example, the processor may identify the rotation speed using the sensor 470 of FIG. 4. For example, the processor may identify the rotation speed based on changes in feature points included in the classification information 1011 of FIG. 10. However, it is not limited thereto.

Referring to FIG. 11, in a first state (operation 1120—NO) in which the first rotation speed is identified, according to an embodiment, in operation 1130, the processor may generate the first screen to be displayed through the display by sampling frames obtained from the second camera (e.g., the second camera 420 of FIG. 4) based on the first resolutions of a plurality of areas included in the FoV formed based on the display. The first rotation speed may be an example of a speed less than the designated speed. The frames may be an example of frames including color information. For example, the processor may perform at least one of operations of FIG. 9 to generate the first screen.

Referring to FIG. 11, in a second state (operation 1120—YES) in which the second rotation speed is identified, according to an embodiment, in operation 1140, the processor may generate the second screen to be displayed through the display by sampling frames obtained from the second camera based on the second resolutions smaller than the first resolutions. For example, the processor may reduce the number of pixels included in the frames by performing sampling based on the second resolutions. The second screen may be an example of a screen based on resolution different from the first screen. The processor may control the display to display the second screen. The display may display the second screen based on being controlled by the processor.

According to an embodiment, a method for reducing a time for a wearable device to render images obtained from a camera is required. In order to reduce the time for rendering, the wearable device may adjust resolutions of each of the areas corresponding to the images. In order to adjust the resolutions, at least one information included in the image may be used.

As described above, according to an embodiment, a wearable device 101 may comprise a display 450, a first camera 410, a second camera 420, and a processor 120. The processor may be configured to obtain posture information 1012 of the wearable device in a space including the wearable device, based on classification information 1011 for selecting at least one feature point, the classification information being based on differences between pixels included in first frames output from the first camera. The processor may be configured to identify, based on a number of the at least one feature point selected in each of the plurality of areas by classification information, resolutions of each of a plurality of areas 830 included in a field-of-view (FoV) formed based on the display. The processor may be configured to change a resolution corresponding to a first area among the plurality of areas to be higher than a resolution corresponding to a second area among the plurality of areas, based on gaze information 1014 indicating a gaze 835 of a user wearing the wearable device. The processor may be configured to adjust all of the identified resolutions to a resolution lower than a designated resolution, in response to recognizing a rotation of the wearable device based on the posture information. The processor may be configured to generate a screen corresponding to second frames output from the second camera, by adjusting a resolution of the second frames based on at least one of the resolution changed based on the gaze information or the resolutions adjusted in response to recognizing the rotation of the wearable device. The processor may be configured to display the generated screen, in FoV, by using the display.

As described above, according to an embodiment, the wearable device 101 may include a display 450, a first camera 410, a second camera 420, and a processor 120. The processor may identify posture information 1012 of the wearable device in a space including the wearable device based on first frames output from the first camera. The processor may identify resolution of each of a plurality of areas 830 included in field-of-view (FoV) formed based on the display, based on classification information 1011, which is used to identify the posture information and includes results of classifying pixels based on differences between the pixels included in the first frames. The processor may change the resolution, among the identified resolutions, corresponding to the first area, among the plurality of areas, to resolution larger than the resolution corresponding to the second area, based on the gaze information 1014 indicating the gaze 835 of the user wearing the wearable device. The processor may change all of the resolutions to a resolution smaller than the designated resolution, in response to identifying the rotation of the wearable device based on the posture information. The processor may perform sampling on second frames output from the second camera based on the resolution changed based on at least one of the rotation of the wearable device or the gaze information. The processor may display a screen based on the sampling for the second frames in the FoV, by controlling the display.

For example, the processor may be configured to obtain segmentation information 1013 for segmenting at least one part in which one or more external objects included in the space are captured in the first frames.

For example, the processor may be configured to identify the resolutions of each of the plurality of areas based on at least one information selected based on time points at which each of the posture information, the classification information, the gaze information, and the segmentation information are obtained.

For example, the segmentation information may include information for grouping pixels included in the first frames.

For example, the processor may be configured to obtain a number of the at least one external object included in each of the plurality of areas based on the segmentation information. The processor may be configured to identify the resolutions of each of the plurality of areas, based on the number of the at least one external object.

For example, the processor may be configured to set the resolutions of each of the plurality of areas, in proportion to the number of the at least one external object.

For example, the processor may be configured to identify the resolutions of each of the plurality of areas based on a number of one or more feature points 620 included in the first frames and identified based on the classification information.

For example, the processor may be configured to set the resolution of each of the plurality of areas in proportion to the number of the one or more feature points.

For example, the first area may include an area 830-5 overlapping with a direction of the gaze.

For example, the processor may be configured to adjust all of the resolutions to be lower than the designated resolution in response to recognizing a speed of the rotation of the wearable device that is higher than or equal to a designated rotation speed.

As described above, according to an embodiment, a method of a wearable device may comprise identifying a rotation speed of the wearable device by using a first camera 410. The method may comprise generating a first screen to be displayed through a display 450, by sampling frames obtained from a second camera 420 based on first resolutions of a plurality of areas 830 included in a field of view (FoV) formed based on the display, in case that the rotation speed of the wearable device is identified as a first rotation speed. The method may comprise generating a second screen to be displayed through the display, by sampling frames obtained from the second camera based on a second resolution lower than the first resolutions, in case that the rotation speed of the wearable device is identified as a second rotation speed exceeding the first rotation speed.

For example, the frames may be first frames. The generating the first screen may comprise identifying resolutions of each of the plurality of areas included in the FoV, based on classification information 1011 including result of classifying pixels based on differences between the pixels included in second frames obtained by using the first camera and used to identify the rotation speed of the wearable device, in case that the rotation speed of the wearable device is identified as a first rotation speed.

For example, the generating the first screen may comprise changing resolution corresponding to a first area among the plurality of areas among the first resolutions, to resolution higher than resolution corresponding to a second area, based on gaze information indicating gaze of a user wearing the wearable device, in case that the rotation speed of the wearable device is identified as a first rotation speed.

For example, the first area may include an area 830-5 overlapping a direction of the gaze.

For example, the identifying the resolutions of each of the plurality of areas may comprise obtaining segmentation information 1013 for segmenting at least one area in which at least one external object included in the second frames is captured. The identifying the resolutions of each of the plurality of areas may comprise identifying the resolutions of each of the plurality of areas based on the obtained segmentation information.

As described above, according to an embodiment, a wearable device 101 may comprise a display 450, a first camera 410, a second camera 420, and a processor 120. The processor may be configured to identify a rotation speed of the wearable device by using the first camera. The processor may be configured to generate a first screen to be displayed through the display, by sampling frames obtained from the second camera based first resolutions of plurality of areas 830 included in a field-of-view (FoV) formed based on the display, in case that the rotation speed of the wearable device identified a first rotation speed. The processor may be configured to generate a second screen to be displayed through the display, by sampling frames obtained from the second camera based on second resolution lower than the first resolutions, in case that the rotation speed of the wearable device is identified as a second rotation speed exceeding the first rotation speed.

For example, the frames may be first frames. The processor may be configured to identify resolutions of each of the plurality of areas included in the FoV, based on classification information 1011 including result of classifying pixels based on differences between the pixels included in second frames obtained by using the first camera and used to identify the rotation speed of the wearable device, in case that the rotation speed of the wearable device is identified as a first rotation speed.

The processor may be configured to change resolution corresponding to a first area among the plurality of areas among the first resolutions, to resolution higher than resolution corresponding to a second area, based on gaze information indicating gaze 835 of a user wearing the wearable device, in case that the rotation speed of the wearable device is identified as a first rotation speed.

For example, the first area may include an area 830-5 overlapping a direction of the gaze.

For example, the processor may be configured to obtain segmentation information 1013 for segmenting at least one area in which at least one external object included in the second frames is captured. The processor may be configured to identify the resolutions of each of the plurality areas based on the obtained segmentation information.

As described above, according to an embodiment, a method of a wearable device 101 may comprise obtaining posture information 1012 of the wearable device in a space including the wearable device, based on classification information 1011 for selecting at least one feature point in pixels, based on differences between the pixels included in first frames output from the first camera. The method may comprise identifying resolutions of each of a plurality areas 830 included in field-of-view (FoV) formed based on the display, based on number of the feature point obtained in each of the plurality of areas by the classification information. The method may comprise changing resolution corresponding to a first area among the plurality of areas to resolution higher than resolution corresponding to a second area, among the identified resolutions, based on gaze information 1014 indicating gaze 835 of a user wearing the wearable device. The method may comprise adjusting all of the resolutions to resolution lower than designated resolution, in response to recognizing rotation of the wearable device based on the posture information. The method may comprise generating a screen corresponding to second frames, by adjusting resolution of the second frames output from the second camera, by using the resolution changed based on at least one of the rotation of the wearable device or the gaze information. The method may comprise displaying the generated screen, in FoV, by using the display.

As described above, according to an embodiment, a method of a wearable device 101 may identifying posture information 1012 of the wearable device in a space including the wearable device based on first frames output from the first camera. The method may comprise identifying resolution of each of a plurality of areas 830 included in field-of-view (FoV) formed based on the display, based on classification information 1011, which is used to identify the posture information and includes results of classifying pixels based on differences between the pixels included in the first frames. The method may comprise changing the resolution, among the identified resolutions, corresponding to the first area, among the plurality of areas, to resolution larger than the resolution corresponding to the second area, based on the gaze information 1014 indicating the gaze 835 of the user wearing the wearable device. The method may comprise changing all of the resolutions to resolution smaller than the designated resolution, in response to identifying the rotation of the wearable device based on the posture information. The method may comprise performing sampling on second frames output from the second camera 420 based on the resolution changed based on at least one of the rotation of the wearable device or the gaze information. The method may comprise displaying a screen based on the sampling for the second frames in the FoV, by controlling the display.

For example, the method may comprise obtaining segmentation information 1013 for segmenting at least one part in which at least one external object included in the space is captured, in the second frames.

For example, the method may comprise identifying the resolutions of each of the plurality of areas based on at least one information selected based on time points at which each of the posture information, the classification information, the gaze information, and segmentation information are obtained.

For example, the method may comprise obtaining the segmentation information including information for grouping pixels included in the first frames.

For example, the method may comprise obtaining number of the at least one external object included in each of the plurality of areas, by using the segmentation information. The method may comprise identifying the resolutions of each of the plurality of areas, based on the number of the at least one external object.

For example, the method may comprise setting the resolutions of each of the plurality of areas, in proportion to the number of the at least one external object.

For example, the method may comprise identifying the resolutions based on number of one or more feature points 620 included in the first frame and identified by the classification information.

For example, the method may comprise setting the resolution in proportion to the number of the one or more feature points.

For example, the method may comprise changing resolution corresponding to the first area that is an area 830-5 overlapping a direction of the gaze indicated by the gaze information, to resolution larger than the resolution corresponding to the second area.

For example, the method may comprise changing all of the resolutions to resolution lower than the designated resolution in response to recognizing a speed of the rotation of the wearable device that is higher than or equal to a designated rotation speed.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), programmable logic unit (PLU), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device, comprising:
a display;
a first camera;
a second camera;
memory, comprising one or more storage media, storing instructions; and
one or more processors communicatively coupled to the display, the first camera, the second camera, and the memory,
wherein the instructions, when executed by the one or more processors individually or collectively, cause the wearable device to:
obtain posture information of the wearable device in a space including the wearable device based on classification information for selecting at least one feature point, the classification information being based on differences between pixels included in first frames output from the first camera,
based on a number of the at least one feature point selected in each of a plurality of areas, identify resolutions of each of the plurality of areas included in a field-of-view (FoV) formed based on the display,
change a resolution corresponding to a first area among the plurality of areas to be higher than a resolution corresponding to a second area among the plurality of areas, based on gaze information indicating a gaze of a user wearing the wearable device,
adjust all of the identified resolutions to be lower than a designated resolution, in response to recognizing a rotation of the wearable device based on the posture information,
generate a screen corresponding to second frames output from the second camera, by adjusting a resolution of the second frames based on at least one of the resolution changed based on the gaze information or the resolutions adjusted in response to recognizing the rotation of the wearable device, and
display the screen, in the FoV, by using the display.

2. The wearable device of claim 1, wherein the instructions, when executed by the one or more processors individually or collectively, further cause the wearable device to:
obtain segmentation information for segmenting at least one part in which at least one external object included in the space is captured in the first frames.

3. The wearable device of claim 2, wherein the instructions, when executed by the one or more processors individually or collectively, further cause the wearable device to:
identify the resolutions of each of the plurality of areas based on at least one information selected based on time points at which each of the posture information, the classification information, the gaze information, and the segmentation information are obtained.

4. The wearable device of claim 2, wherein the segmentation information includes information for grouping pixels included in the first frames.

5. The wearable device of claim 2, wherein the instructions, when executed by the one or more processors individually or collectively, further cause the wearable device to:
obtain a number of the at least one external object included in each of the plurality of areas based on the segmentation information, and
identify the resolutions of each of the plurality of areas based on the number of the at least one external object.

6. The wearable device of claim 5, wherein the instructions, when executed by the one or more processors individually or collectively, further cause the wearable device to:
set the resolutions of each of the plurality of areas in proportion to the number of the at least one external object.

7. The wearable device of claim 2, wherein the instructions, when executed by the one or more processors individually or collectively, further cause the wearable device to:
identify the resolutions of each of the plurality of areas based on a number of one or more feature points included in the first frames and identified based on the classification information.

8. The wearable device of claim 7, wherein the instructions, when executed by the one or more processors individually or collectively, further cause the wearable device to:
set the resolutions of each of the plurality of areas in proportion to the number of the one or more feature points.

9. The wearable device of claim 1, wherein the first area includes an area overlapping with a direction of the gaze.

10. The wearable device of claim 1, wherein the instructions, when executed by the one or more processors individually or collectively, further cause the wearable device to:
adjust all of the resolutions to be lower than the designated resolution in response to recognizing a speed of the rotation of the wearable device that is higher than or equal to a designated rotation speed.

11. A method performed by a wearable device, wherein the method comprises:
identifying a rotation speed of the wearable device by using a first camera;
generating a first screen to be displayed through a display by sampling frames obtained from a second camera based on first resolutions of a plurality of areas included in a field of view (FoV) formed based on the display, in case that the rotation speed of the wearable device is identified as a first rotation speed, the first screen being generated further by identifying resolutions of each of the plurality of areas included in the FoV and classifying pixels based on differences between pixels included in second frames obtained by using the first camera used to identify the rotation speed of the wearable device; and
generating a second screen to be displayed through the display by sampling frames obtained from the second camera based on a second resolution lower than the first resolutions, in case that the rotation speed of the wearable device is identified as a second rotation speed exceeding the first rotation speed.

12. The method of the wearable device of claim 11, wherein the frames are first frames, and
wherein the generating of the first screen comprises:
identifying the resolutions of each of the plurality of areas included in the FoV based on classification information including a result of the classifying of the pixels based on the differences between the pixels included in the second frames, in case that the rotation speed of the wearable device is identified as the first rotation speed.

13. The method of the wearable device of claim 12, wherein the generating of the first screen further comprises:
changing resolution corresponding to a first area among the plurality of areas among the first resolutions to resolution higher than resolution corresponding to a second area, based on gaze information indicating a gaze direction of a user wearing the wearable device, in case that the rotation speed of the wearable device is identified as the first rotation speed.

14. The method of the wearable device of claim 13, wherein the first area includes an area overlapping a direction of the gaze.

15. The method of the wearable device of claim 12, wherein the identifying of the resolutions of each of the plurality of areas comprises:
obtaining segmentation information for segmenting at least one area in which at least one external object included in the second frames is captured; and
identifying the resolutions of each of the plurality of areas based on the obtained segmentation information.

16. A wearable device, comprising:
a display;
a first camera;
a second camera;
memory, comprising one or more storage media, storing instructions; and
one or more processors communicatively coupled to the display, the first camera, the second camera, and the memory,
wherein the instructions, when executed by the one or more processors individually or collectively, cause the wearable device to:
identify a rotation speed of the wearable device by using the first camera,
generate a first screen to be displayed through the display by sampling frames obtained from the second camera based on first resolutions of a plurality of areas included in a field-of-view (FoV) formed based on the display, in case that the rotation speed of the wearable device is identified as a first rotation speed, the first screen being generated further by identifying resolutions of each of the plurality of areas included in the FoV and classifying pixels based on differences between pixels included in second frames obtained by using the first camera used to identify the rotation speed of the wearable device, and
generate a second screen to be displayed through the display by sampling frames obtained from the second camera based on a second resolution lower than the first resolutions, in case that the rotation speed of the wearable device is identified as a second rotation speed exceeding the first rotation speed.

17. The wearable device of claim 16,
wherein the frames are first frames, and
wherein the instructions, when executed by the one or more processors individually or collectively, further cause the wearable device to:
identify the resolutions of each of the plurality of areas included in the FoV based on classification information including a result of the classifying of the pixels based on the differences between the pixels included in the second frames, in case that the rotation speed of the wearable device is identified as the first rotation speed.

18. The wearable device of claim 17, wherein the instructions, when executed by the one or more processors individually or collectively, further cause the wearable device to:
  change resolution corresponding to a first area among the plurality of areas among the first resolutions, to resolution higher than resolution corresponding to a second area, based on gaze information indicating a gaze direction of a user wearing the wearable device, in case that the rotation speed of the wearable device is identified as the first rotation speed.

19. The wearable device of claim 18, wherein the first area includes an area overlapping a direction of the gaze.

20. The wearable device of claim 17, wherein the instructions, when executed by the one or more processors individually or collectively, further cause the wearable device to:
  obtain segmentation information for segmenting at least one area in which at least one external object included in the second frames is captured, and
  identify the resolutions of each of the plurality of areas based on the obtained segmentation information.

* * * * *